US007845259B2

(12) United States Patent
Workman et al.

(10) Patent No.: US 7,845,259 B2
(45) Date of Patent: Dec. 7, 2010

(54) ELECTRONIC PAPER CUTTING APPARATUS

(75) Inventors: Robert Emmett Workman, Morgan, UT (US); William Craig Youse, Provo, UT (US); Jason B. Brinkerhoff, Lindon, UT (US); Jonathan Aaron Johnson, Orem, UT (US); Ken Yan, Guangdong (CN); Michael S. Horito, Provo, UT (US); Gerardo D. Ayala, Provo, UT (US); James R. Gunter, Provo, UT (US); Rodney Stock, San Rafael, CA (US); Phil Beffrey, Petaluma, CA (US)

(73) Assignee: Provo Craft and Novelty, Inc., South Jordan, UT (US)

( * ) Notice: Subject to any disclaimer, the term of this patent is extended or adjusted under 35 U.S.C. 154(b) by 420 days.

(21) Appl. No.: 11/457,415

(22) Filed: Jul. 13, 2006

(65) Prior Publication Data

US 2007/0017332 A1 Jan. 25, 2007

Related U.S. Application Data

(60) Provisional application No. 60/699,210, filed on Jul. 14, 2005.

(51) Int. Cl.
*B26D 5/20* (2006.01)
*B23D 25/00* (2006.01)

(52) U.S. Cl. ......................... 83/436.3; 83/76.3; 83/76.1

(58) Field of Classification Search ..................... 83/76, 83/76.3, 76.9, 76.6, 76.1, 436.3, 284, 286, 83/373, 401; 400/693; 347/152, 170, 222, 347/245
See application file for complete search history.

(56) References Cited

U.S. PATENT DOCUMENTS

| | | | |
|---|---|---|---|
| 1,375,721 | A | 4/1921 | Nichols |
| 2,477,986 | A | 8/1949 | Kennerly |
| 2,483,750 | A | 10/1949 | Brotrud |
| 2,702,496 | A | 2/1955 | Davis et al. |

(Continued)

FOREIGN PATENT DOCUMENTS

EP 1 557 246 A2 7/2005

(Continued)

OTHER PUBLICATIONS

HP PSC 1210. Article by Eric Greystad. Mar. 24, 2003. http://www.smallbusinesscomputing.com/testdrive/article.php/2168941.*

(Continued)

*Primary Examiner*—Kenneth E. Peterson
*Assistant Examiner*—Sean Michalski
(74) *Attorney, Agent, or Firm*—Honigman Miller Schwartz and Cohn LLP

(57) ABSTRACT

An electronic paper cutting machine includes a housing to which a drive roller is coupled for moving a sheet to be cut in a first direction and a cutter assembly coupled to the housing and moveable in a second direction that is perpendicular to the first direction. A user interface is incorporated into the housing for allowing a user to select via the user interface at least one shape to be cut by the cutter assembly wherein controlled movement of the drive roller and the cutter assembly causes a shape to be cut in the sheet.

13 Claims, 19 Drawing Sheets

U.S. PATENT DOCUMENTS 2,941,511 A 6/1960 Cieremans
3,130,622 A 4/1964 Eno
3,166,844 A 1/1965 Pascoe et al.
3,166,846 A 1/1965 Pascoe et al.
3,413,985 A 12/1968 Dlouhy et al.
3,477,322 A 11/1969 Gerber et al.
3,511,124 A 5/1970 Bruns
3,569,683 A 3/1971 Pugh
3,716,716 A 2/1973 Marantette et al.
3,772,949 A 11/1973 Pavone et al.
3,776,072 A 12/1973 Gerber et al.
3,777,616 A 12/1973 Mueller
3,805,650 A 4/1974 Pearl
3,864,997 A 2/1975 Pearl et al.
3,895,358 A 7/1975 Pearl
4,002,366 A 1/1977 Hammes
4,047,457 A 9/1977 Stubbings
4,060,016 A 11/1977 Gerber
4,103,580 A 8/1978 Sauer et al.
4,133,234 A 1/1979 Gerber
4,178,820 A 12/1979 Gerber
4,331,051 A 5/1982 Gerber et al.
4,337,576 A 7/1982 Drost et al.
4,367,588 A 1/1983 Herbert
4,393,450 A 7/1983 Jerard
4,393,587 A 7/1983 Kloosterman
4,430,718 A 2/1984 Hendren
4,436,013 A 3/1984 Gerber
4,467,525 A 8/1984 Logan et al.
4,505,174 A 3/1985 Carithers, Jr.
4,512,839 A 4/1985 Gerber
4,524,894 A 6/1985 Leblond
4,537,582 A 8/1985 Liu
4,577,539 A 3/1986 Bonacci
4,608,891 A 9/1986 Frisby et al.
4,641,556 A 2/1987 Vigneron et al.
4,675,825 A 6/1987 DeMenthon
4,682,401 A 7/1987 Tadashi et al.
4,709,483 A 12/1987 Hembree et al.
4,713,886 A 12/1987 Ikeda
4,793,033 A 12/1988 Schneider et al.
4,794,698 A 1/1989 Fassett, II
4,841,822 A 6/1989 Gerber
4,856,197 A 8/1989 Auer et al.
4,868,761 A 9/1989 Hayashi
4,882,836 A 11/1989 Higuchi et al.
4,882,837 A 11/1989 Higuchi et al.
4,920,495 A 4/1990 Pilkington
4,949,466 A 8/1990 Auer et al.
4,996,651 A 2/1991 Wells
5,031,483 A 7/1991 Weaver
5,038,654 A 8/1991 Mackey
5,042,338 A 8/1991 Gerber
5,042,339 A 8/1991 Gerber
5,074,178 A 12/1991 Shetley et al.
5,094,134 A 3/1992 Mizukoshi
5,119,704 A 6/1992 Wolfson
5,131,303 A 7/1992 Wilson et al.
5,134,911 A 8/1992 Busky et al.
5,138,341 A 8/1992 Kobayashi
5,163,675 A 11/1992 Sunohara
5,175,689 A 12/1992 Matsushita et al.
5,188,009 A 2/1993 Sunohara et al.
5,197,198 A 3/1993 Onozato
5,214,590 A 5/1993 Schnetzer
5,216,614 A 6/1993 Kuchta et al.
5,230,764 A 7/1993 Moll et al.
5,253,176 A 10/1993 ToDoroki et al.
5,353,232 A 10/1994 Vollmayr
5,353,355 A 10/1994 Takagi et al.
5,388,488 A 2/1995 Geidl et al.
5,396,160 A 3/1995 Chen
5,398,579 A 3/1995 Bando
5,407,415 A 4/1995 Spishak
5,438,896 A 8/1995 Carroll
5,443,194 A 8/1995 Takahashi
5,454,287 A 10/1995 Fuchigami et al.
5,495,671 A 3/1996 Shun-Yi
5,517,407 A 5/1996 Weiner
5,537,904 A 7/1996 Albin
5,547,003 A 8/1996 Susnjara et al.
5,561,601 A 10/1996 Inoue et al.
5,595,560 A 1/1997 Kamada
5,634,388 A 6/1997 Fuchigami et al.
5,669,866 A 9/1997 Julian et al.
5,701,251 A 12/1997 Yoshimura
5,701,790 A 12/1997 Saito et al.
5,727,433 A 3/1998 Pomerleau et al.
5,777,880 A 7/1998 Bowen et al.
5,791,215 A 8/1998 Morrison et al.
5,806,390 A 9/1998 Pomerleau et al.
5,832,801 A 11/1998 Bando
5,847,956 A 12/1998 Bronfeld et al.
5,855,149 A 1/1999 Islam et al.
5,857,398 A 1/1999 Bando
5,867,392 A 2/1999 Bousquet et al.
5,868,056 A 2/1999 Pfarr et al.
6,018,687 A 1/2000 Tabor
6,021,572 A 2/2000 Smith
6,050,164 A 4/2000 Kuchta
6,053,495 A 4/2000 Hara et al.
6,112,630 A 9/2000 Miura
6,121,889 A 9/2000 Janda et al.
6,173,211 B1 1/2001 Williams et al.
6,209,435 B1 4/2001 Miyazaki et al.
6,266,572 B1 7/2001 Yamazaki et al.
6,283,001 B1 9/2001 Schultes et al.
6,363,298 B1 3/2002 Shin et al.
6,382,744 B1 5/2002 Xiao et al.
6,441,338 B1 8/2002 Rabinovich
6,459,952 B1 10/2002 Dundorf
6,491,361 B1 12/2002 Spann
6,499,840 B2 12/2002 Day et al.
6,502,489 B2 1/2003 Gerent et al.
6,536,115 B2 3/2003 Tabbi et al.
6,547,098 B1 4/2003 Kaye
6,554,163 B1 4/2003 Kaye
D474,806 S * 5/2003 Yamano et al. .............. D18/55
6,557,730 B1 5/2003 Kaye
6,560,499 B1 5/2003 Demmer
6,563,904 B2 5/2003 Wijts et al.
6,608,618 B2 8/2003 Wood et al.
D479,264 S * 9/2003 Suzuki et al. ................ D18/55
6,619,166 B2 9/2003 Miyazaki et al.
RE38,286 E 10/2003 Flowers
6,635,001 B2 10/2003 Lynch et al.
6,641,401 B2 11/2003 Wood et al.
6,659,454 B1 * 12/2003 Smith et al. ................. 271/213
6,668,156 B2 12/2003 Lynch et al.
6,675,059 B2 1/2004 Scott
6,684,514 B2 2/2004 Welch
6,711,854 B1 3/2004 Andersen
D489,754 S * 5/2004 Akahane et al. .............. D18/55
6,750,978 B1 6/2004 Marggraff et al.
6,781,821 B2 8/2004 Tsubai et al.
6,830,304 B2 12/2004 Suzuki et al.
6,830,401 B1 * 12/2004 Hwang et al. ............... 400/693
6,887,003 B2 5/2005 Someno
6,915,086 B2 * 7/2005 Huang ......................... 399/49
7,056,040 B2 * 6/2006 Silverbrook et al. .......... 400/88
7,125,184 B2 * 10/2006 Cheng et al. ................ 400/693
7,164,490 B2 1/2007 Manico et al.
7,290,952 B2 * 11/2007 Kagami ...................... 400/693
7,413,362 B2 * 8/2008 Bandou ...................... 400/693

| | | | | |
|---|---|---|---|---|
| 7,414,833 | B2 * | 8/2008 | Kittayapong | 361/679.27 |
| 2002/0066344 | A1 | 6/2002 | Ewing et al. | |
| 2003/0012454 | A1 | 1/2003 | Manico et al. | |
| 2003/0118229 | A1 | 6/2003 | Andrews et al. | |
| 2003/0183056 | A1 | 10/2003 | Kersch et al. | |
| 2004/0043365 | A1 | 3/2004 | Kelley et al. | |
| 2004/0094003 | A1 | 5/2004 | Bar-Erez | |
| 2004/0101337 | A1 | 5/2004 | Woodman et al. | |
| 2005/0186010 | A1 | 8/2005 | Shibata et al. | |
| 2005/0193568 | A1 | 9/2005 | Peyrot et al. | |
| 2006/0117922 | A1 | 6/2006 | Causse et al. | |
| 2006/0200267 | A1 | 9/2006 | Aamodt et al. | |
| 2009/0123210 | A1 * | 5/2009 | Harris | 400/693 |

FOREIGN PATENT DOCUMENTS

| | | |
|---|---|---|
| JP | 62-169209 | 7/1984 |
| JP | 59-206904 | 11/1984 |
| JP | 60-179804 | 9/1985 |
| JP | 61-004647 | 1/1986 |
| JP | 01-295718 | 11/1989 |
| JP | 02-205975 | 8/1990 |
| JP | 02-278674 | 10/1990 |
| JP | 02-278675 | 10/1990 |
| JP | 02-287803 | 11/1990 |
| JP | 04-066232 | 3/1992 |
| JP | 04-293000 | 10/1992 |
| JP | 05-168773 | 7/1993 |
| JP | 05-305599 | 11/1993 |
| JP | 08-052685 | 2/1996 |
| JP | 08-066894 | 3/1996 |
| JP | 08-071980 | 3/1996 |
| JP | 09-323296 | 12/1997 |
| JP | 10-034589 | 2/1998 |
| JP | 2003-316407 | 11/2003 |

OTHER PUBLICATIONS

"CraftRobo:Graphtec." (Title page). *CraftRoboGraphtec*. Oct. 27, 2006, p. 1. http://www.graphteccorp.com/craftrobo/.

"Software: CraftRobo-Graphic." *CraftRoboGraphtec*. Oct. 27, 2006, pp. 1-2. http://www.graphteccorp.com/craftrobo/things/software.html.

"Things to know: CraftRobo-Graphtec." *CraftRoboGraphtec*. Oct. 27, 2006, pp. 1-2. http://www.graphteccorp.com/craftrobo/things/index.html.

Craft ROBO: User's Manual. Manual No. CC100-UM-152. 1st Edition issued Aug. 10, 2004, pp. i-ii, 1-1-3-24, Appendix, Index.

Cutting Master ROBO: OPS 658 User's Manual. Manuel No. OPS658-UM-151, pp. 1-9.

ROBO Master: OPS 656 User's Manual. Manuel No. OPS656-UM-151. 1st Edition issued Aug. 13, 2004, pp. 1-34.

"What is Craft ROBO? : CraftRobo-Graphtec." *CraftRoboGraphtec*. Oct. 27, 2006, pp. 1-3. http://www.graphteccorp.com/craftrobo/about.html.

Digital Art Solutions: Software and Artwork Specials Price List, p. 1.

Digital Art Solutions: Summa DC3 Plus, pp. 1-2.

Digital Art Solutions: Why You Should Buy a Craft Cutter from Digital Art Solutions, pp. 1-2.

Digital Graphics Incorporation: Omega Series Operator's Manual OM-60 / OM-40, pp. 1-1-9-1.

"What's New at MagiCut." *MagiCut International Ltd*. Oct. 27, 2006, pp. 1-2. http://www.magicut.com/news/index.htm.

"The Creative Cutter Instruction Manual: Set Your Imagination Free!" *Pazzles*, pp. i-xii, 1-.

Creative Cutter Supplementary Method Instruction Manual. *Pazzles*.

"Fall 2004 Price List: Creative Cutter: Set Your Imagination Free!" *Pazzles*.

"Spring 2005 Price List: Creative Cutter: Set Your Imagination Free!" *Pazzles*.

"Cutting Shapes and Text with Wishblade Basic or Wishblade Advanced." *Wishblade Personal Media Cutter*, pp. 1-2.

Wishblade Operational Manual: Setup Instruction Sheet for the Wishblade (WB100-20), pp. 1-2.

Wishblade Personal Media Cutter: Wishblade WB100-20, pp. 3-11. 2004.

"Printing and Cutting with Wishblade Advanced." *Wishblade Personal Media Cutter*, pp. 1-2.

* cited by examiner

ELECTRONIC PAPER CUTTING APPARATUS

CROSS-REFERENCE TO RELATED APPLICATION

The present application claims priority to and hereby incorporates by reference U.S. Provisional Patent Application Ser. No. 60/699,210 filed on Jul. 14, 2005.

BACKGROUND OF THE INVENTION

1. Field of the Invention

The present invention relates generally to an electronic cutting machine, and more particularly to an electronic cutting machine that can be operated as a stand alone machine without the need of connection to any other peripheral device such as a personal computer.

2. State of the Art

As scrapbooking has become a national phenomenon, various new products have been introduced to the mark to embellish and customize scrapbook pages. One product that has seen significant commercial success has been the introduction of various die cutting devices. Die cutting devices typically employ the use of one or more dies having a cutting blade of a particular configuration and a press for firmly pressing a die against a sheet of paper or other material in sheet form to cut the sheet with the die into the desired shape. These systems are typically hand operated.

Another system for cutting shapes in sheet materials is an electronic vinyl cutter. Electronic vinyl cutters are configured to cut a shape or series of shapes in a sheet of adhesive backed vinyl that can be peeled from the sheet and applied to another material, such as a banner, for forming a relatively inexpensive sign. These electronic vinyl cutters are relatively expensive and require connection to a computer and computer software to drive the electronic cutter.

The electronic vinyl cutters have been employed to cut paper materials for use in the arts and crafts industry. The machines, however, must be connected to an external computer running software to control the movement of the cutter. In addition, the machines themselves are not generally configured in a manner that makes them simple to operate.

As such, there exists a need for an electronic cutting machine that is configured specifically for cutting paper and other materials in sheet form that is easy to operate and can operate independently of a personal computer or other external device.

SUMMARY OF THE INVENTION

An electronic cutting machine of the present invention is comprised of a cutting element for cutting a sheet of material, drive rollers for controlling movement of the sheet, and electronics for controlling movement of the cutting element and the drive rollers. The electronic cutting machine operates by moving the cutting element in an "x-direction" and the sheet in a "y-direction." That is, when the cutting element is placed against the sheet, a controlled cut is made by moving the cutting element back and forth while the sheet is moved perpendicular to the movement of the cutting element. By precisely controlling these two movements, a particular shape can be cut into the sheet.

The electronic cutter of the present invention is configured to operate as a stand-alone machine without any need for connection to a personal computer or other external device.

All of the functions of the electronic cutting machine can be controlled by the user through a user interface provided on the electronic cutter.

In one particular embodiment, various shapes to be cut with the electronic cutter are provided on a separate cartridge. When a user desires a particular image, a cartridge containing that image is inserted into the machine. The user can then select the image to be cut using the user interface, such as a keypad, and instruct the machine to cut the image.

In another embodiment, the shapes for being cut are stored in memory on the machine. The user then uses the user interface to select a particular shape or series of shapes to be cut from the library of shapes stored on the machine.

The machine is easily operated by a user. In one embodiment, the machine includes a pair of "clam shell" doors that open when the ON button of the machine is depressed. The bottom door forms the support tray for the paper being cut while the upper door reveals the user interface when opened.

The sheet to be cut is placed upon a mat having a tacky adhesive applied thereto for removably retaining the sheet. The mat and sheet are inserted into the machine and the blade holder is moved using the user interface over a select position on the mat. The desired shape is selected for cutting and the machine is instructed to cut the shape.

In one embodiment, a size of an image to be cut can be scaled by the user by selecting a desired shape of the image and rotating a sizing wheel until the desired size is displayed.

In one embodiment of the present invention, the cutting element is comprised of a blade holder and a blade. The blade holder allows the blade to freely swivel within the blade holder so that the blade will orient itself in the direction of the cut being made. The blade holder allows for the length of blade extending from the blade housing to be easily and precisely adjusted by a user. In addition, the blade housing is configured to precisely set the blade within the housing during the manufacturing process so as to ensure that each blade holder/blade assembly is properly configured.

The foregoing advantages and characterizing features will become apparent from the following description of certain illustrative embodiments of the invention. The above-described features and advantages of the present invention, as well as additional features and advantages, will be set forth or will become more fully apparent in the detailed description that follows and in the appended claims. The novel features which are considered characteristic of this invention are set forth in the attached claims. Furthermore, the features and advantages of the present invention may be learned by the practice of the invention, or will be obvious to one skilled in the art from the description, as set forth hereinafter.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION OF THE ILLUSTRATED EMBODIMENTS

Figure 1:
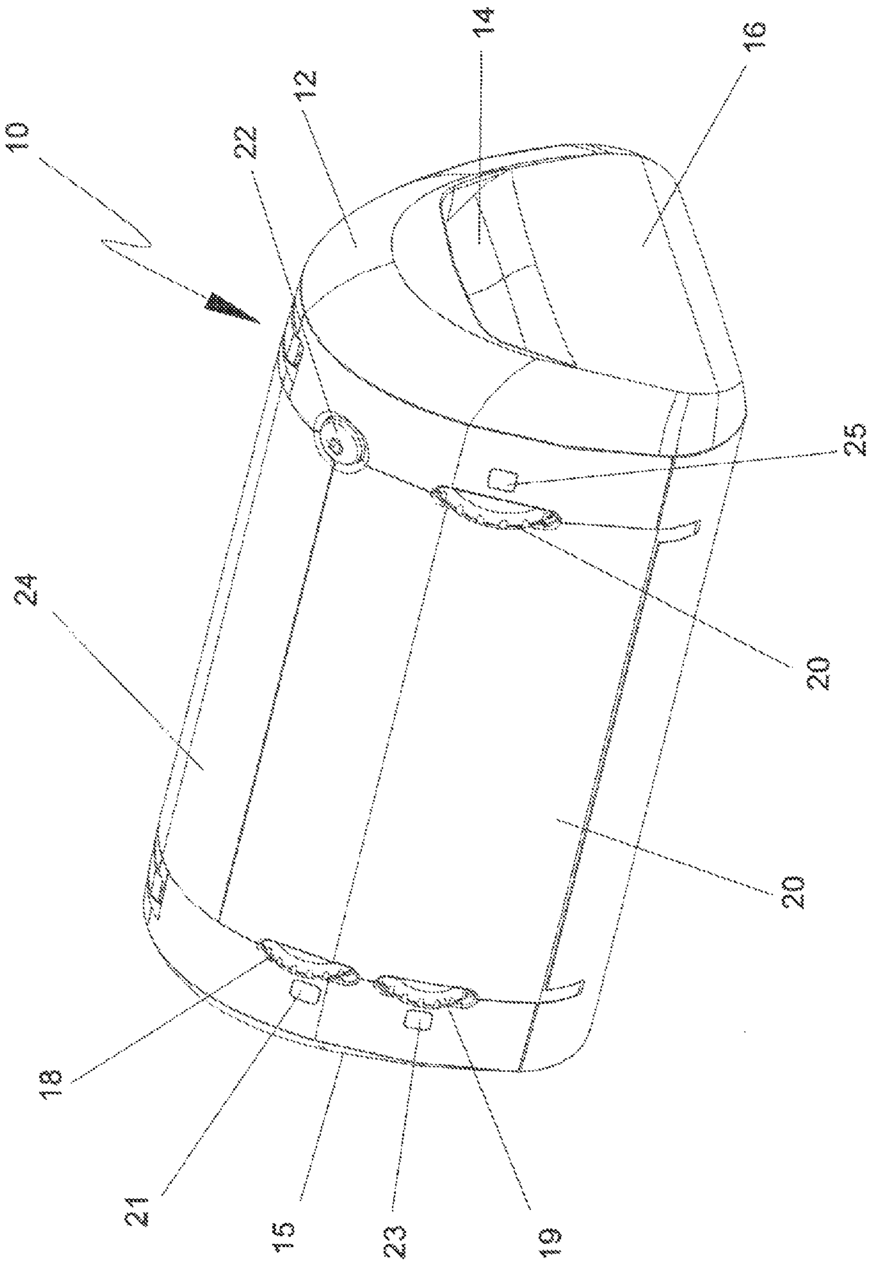
FIG. 1 is a perspective front view of an electronic cutter in a closed configuration in accordance with the principles of the present invention.

Referring now to the drawings, FIG. 1 illustrates an electronic cutter, generally indicated at 10, in accordance with the present invention. The electronic cutter 10 is a stand-alone machine that is fully functional without the need for connection to an external computer. All of the cutting components of the cutter 10 are housed within the external housing, generally indicated at 12, of the cutter 10. In addition, all of the software and electronics for driving the cutting components of the cutter 10 are housed within the external housing, as well as a removable and/or downloadable memory storage device for containing images, shapes, fonts and the like to be cut by the cutting components, so that the unit is fully operational and self contained. The housing is provided with recesses 14 on its left and right sides 15 and 16 for providing a place to grasp the sides 15 and 16 of the cutter 10 for lifting and carrying. In addition, rotatable wheels or dials 18, 19 and 20 protrude through the housing 12. The wheels 18, 19 and 20 are rotatable by a user to alter certain parameters of the cutter 10 such as the size of the image to be cut, the pressure of the blade when cutting, and the speed of cutting. As will be described in more detail, herein, the speed and pressure of the cutting process can be modified based upon the type of material being cut so as to prevent tearing of the material and/or to ensure that the blade is completely cutting through the material. Associated with each dial 18, 19 and 20 are windows 21, 23 and 25, respectively, through which is visible a particular indicating character corresponding to the function of the dial 18, 19 or 20. For example, the dial 20 may be employed to modify the size of the image or shape to be cut. Thus, rotation of the dial 20 also rotates a cylinder (not shown) behind the window 25. The cylinder is printed with different sizes thereon (e.g., 1, 1¼, 1½, 2, 2½, 3, 3½, 4, 4½, 5 and 5½). Of course, other graphical representations could be used and other mechanisms to display the size selection could be employed. When the dial 20 is set to a particular size, the cutter 10 will automatically adjust the size of the image or shape to be cut and subsequently cut an image of approximately the size indicated (in height) when instructed by the user to cut. Likewise, the dials 18 and 19 are connected to cylinders having characters printed thereon for indicating to a user through their respective windows 21 and 23 the pressure of the cut and the speed of the cut.

Each dial 18, 19 and 20 is connected to a potentiometer or other device known in the art for sending a signal to the processor of the machine to change the corresponding parameter. With specific reference to the speed of the cut, in addition to manual adjustment of the speed through manipulation of one of the dials, the machine itself may be configured to automatically adjust the speed depending upon the pressure set by the user, which may indicate a thicker material being cut. In addition, for a given speed of cut, as may be set by the user, the machine will adjust the speed of the cut depending upon the curvature of the cut being made. For example, when cutting a straight line, the machine can move more rapidly through the material without causing a tear in the material. On tight corners, however, if the cut is moving too quickly, the material can be ripped. As such, the machine will automatically adjust its speed depending upon the radius of the arc being cut to prevent the material from ripping when cutting arcs of smaller radii. Thus, when cutting, the machine will automatically adjust "on-the-fly" the speed of the cut as the cut is being made.

At the top, right of the machine front is a power or "ON" button 22 used to power up the cutter 10. This button 22 serves a dual purpose. First, it is a switch to turn the machine on when depressed by a user. Second, the button 22 causes actuation of the doors 24 and 26 from a closed position as shown to an open position (see FIG. 2). Thus, when the button 22 is pressed, the doors 24 and 26 open to reveal a user interface and the cutting assembly of the cutter 10.

Figure 2:
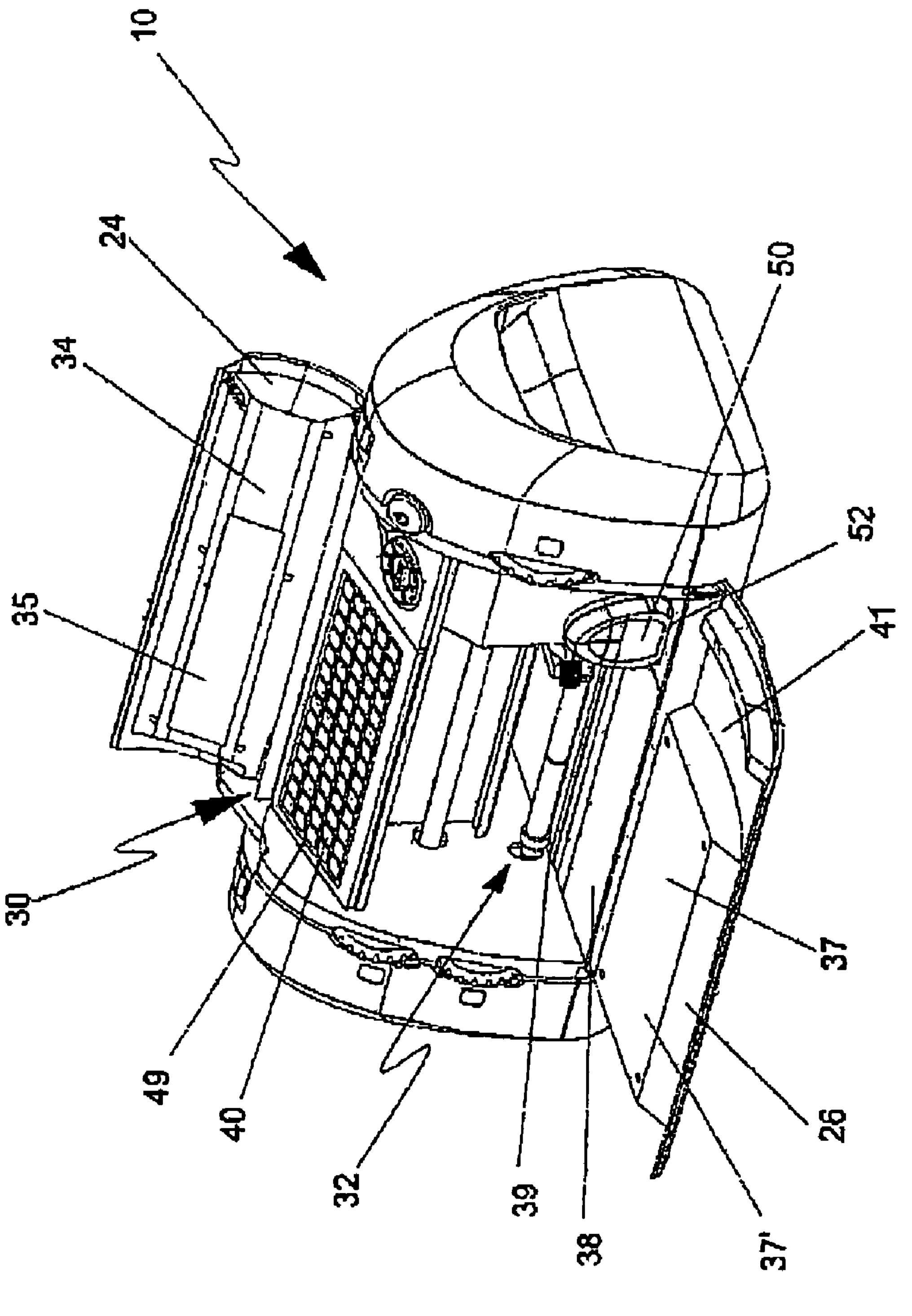
FIG. 2 is a perspective front view of the electronic cutter shown in FIG. 1 in an open configuration.

Referring now to FIG. 2, the cutter 10 is illustrated in an open position in which the user interface, generally indicated at 30, and cutter assembly, generally indicated at 32, are shown. The back surface 34 of the top door 24 houses a visual display 35, such as an LCD display. Certain relevant data, such as the shape or shapes selected for being cut, the size of the shape, the status of the progress of a particular cut, error messages, etc. can be displayed on the display 35 so that the user can have visual feedback of the operation of the machine.

The back surface 37 of the bottom door 26 provides a support tray for the mat and material being cut by the cutter 10 so that the material and mat (not shown) remain in a substantially horizontal orientation when being cut. In addition, the inner bottom surfaces 38 of the cutter are also generally horizontal and planar in nature to support the material being cut in a substantially flat configuration. In some prior art machines that have been adapted from the vinyl sign cutting field to the paper cutting field, the machines have generally retained a curved support surface. The curvature of the support surface was generally employed to accommodate the material being cut, namely adhesive backed vinyl, typically in a roll form. Such a configuration is not particularly conducive to cutting sheets of material such as paper and the like where bending can cause portions of the images being cut to lift from the planar surface defined by the sheet causing the blade or blade holder to catch any such raised portions that could damage the material of the shape being cut. The inner surface 37 of the door 26 thus includes a planar surface portion 37' that is substantially coplanar with the inner bottom surface or bed 38 of the cutter adjacent the drive roller 39. In addition, the inner surface 37 defines a recess 41 for accommodating the cartridge 50 when the door 26 is in a closed position as shown in FIG. 1. This allows for a more compact configuration of the machine 10 with the cartridge 50 fitting within the door 26. Thus, the machine can be transported with the cartridge 50 positioned inside with the door 26 closed.

Figure 2A:
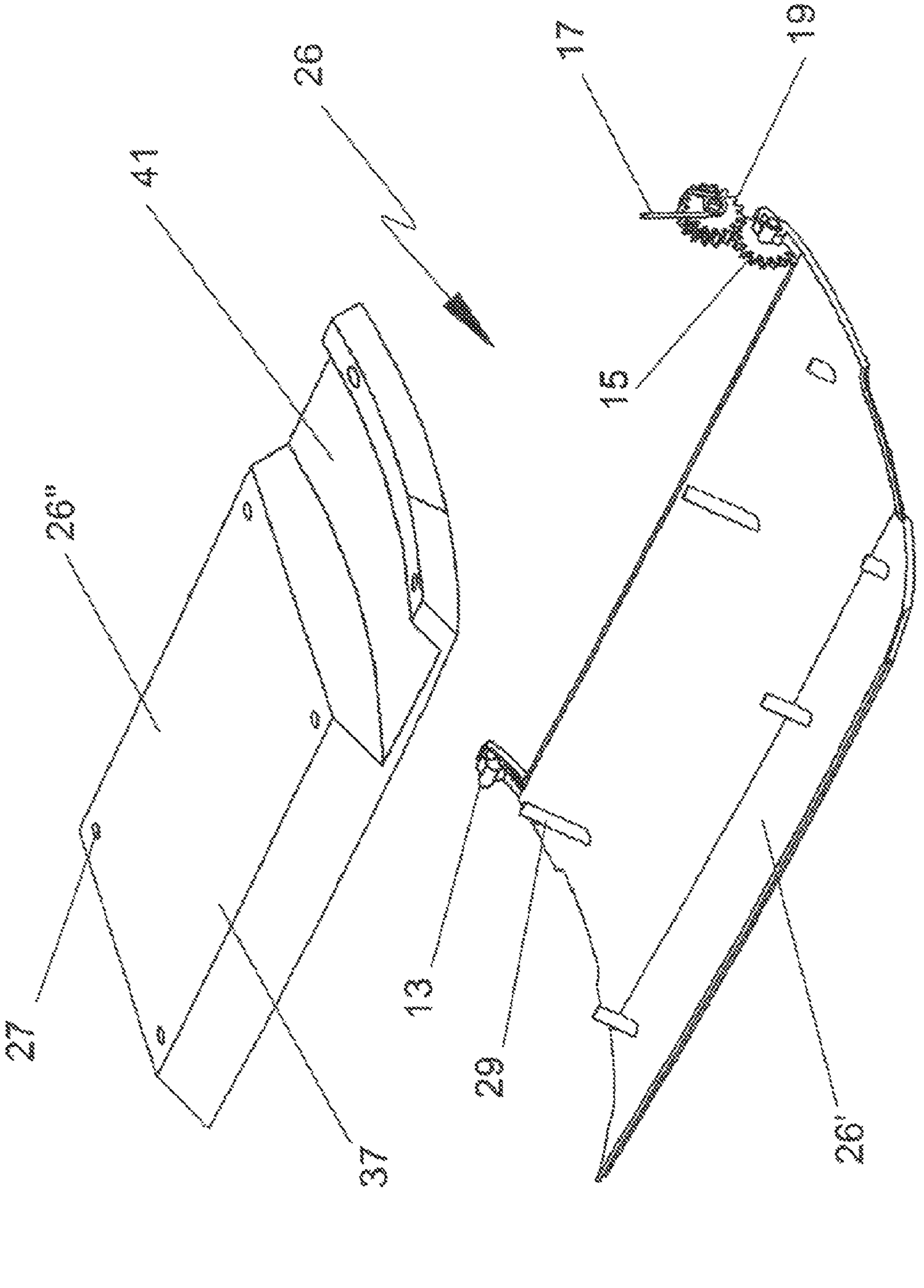
FIG. 2A is an exploded perspective front view of the bottom door shown in FIG. 2.

As further illustrated in FIG. 2A, the bottom door 26 is comprised of two principal pieces, the outer surface piece 26' and the inner surface piece 26". The two sections 26' and 26" are mated together with a plurality of threaded fasteners (e.g., Phillips head screws) that are inserted into holes, such as hole 27, and threadedly engaged into posts, such as post 29. Of course, other methods known in the art may be used to attache the two sections 26' and 26" together, such as welding, bonding, adhering or any other suitable means. Both the top door 24 and the bottom door 26 are biased into an open position as with coil spring 17. In addition, to provide a controlled opening of the door 26, the door 26 is gear driven with gears 15 and 19. The gears 15 and 19 are provided to cause the door 26 to open at a controlled rate. A pivotally attached support arm 13 is provided on the opposite side of the gears 15 and 19 to support the door 26 in the open position and to allow the door 26 to rotate to an open position as shown in FIG. 2. As described above, the inner section 26" of the door 26 has a dual contour defining a substantially planar mat support surface 37 and a cartridge recess 41. Of course, the shape of the recess 41 could be modified to any configuration that would allow the door 26 to close around the cartridge 50 shown in FIG. 2.

Figure 2B:
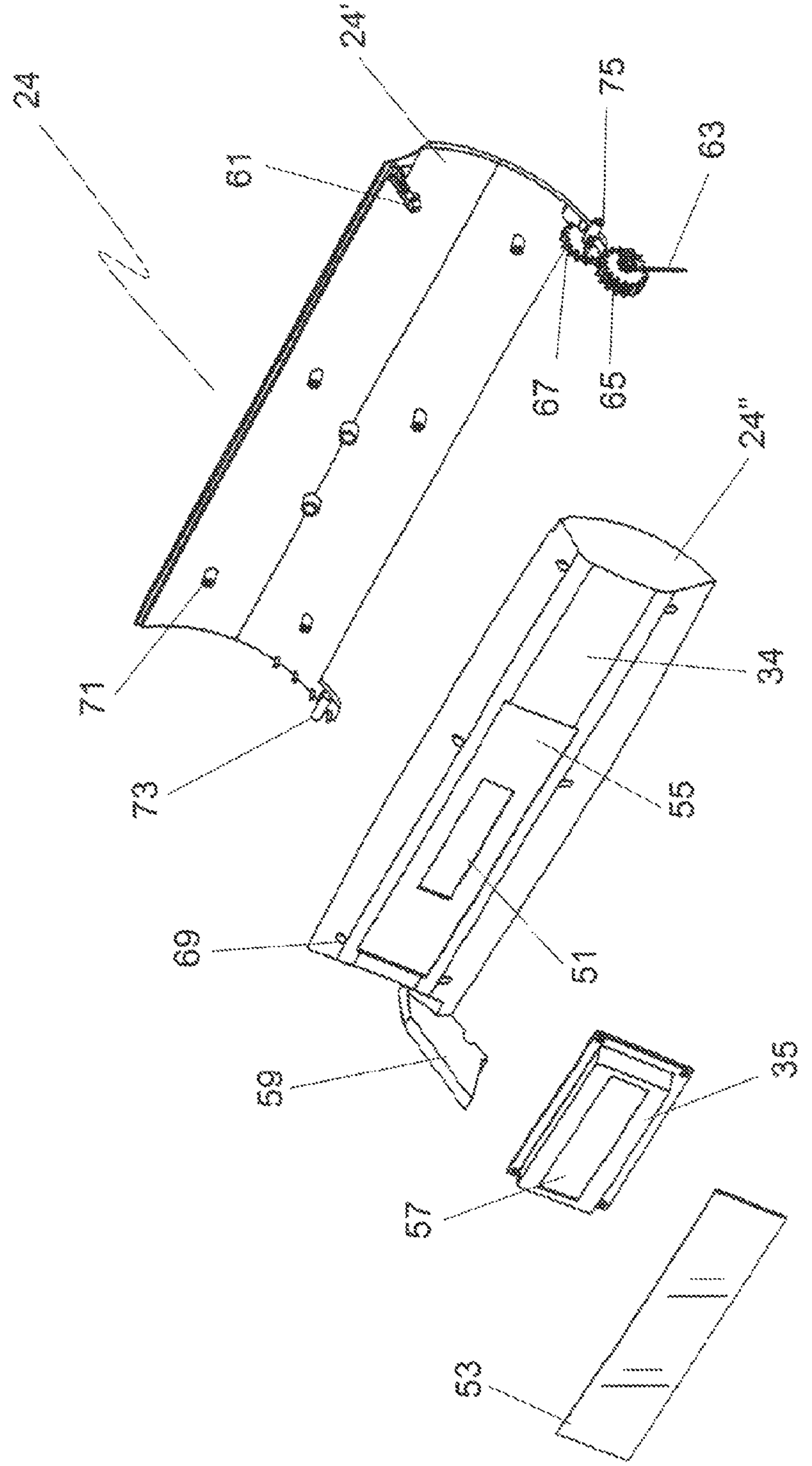
FIG. 2B is an exploded perspective front view of the top door shown in FIG. 2.

Similarly, as shown in FIG. 2B, the upper door assembly 24 is comprised of an outer shell section 24', which forms a portion of the exterior surface of the cutter 10, and an inner section 24", which houses the display 35. In this example, the display comprises a liquid crystal display ("LCD") device that is visible through a window 51 formed in the inner section 24". A transparent cover 53 is configured to be attached within a recess 55 formed in the inner surface 34 for protecting the screen 57 of the LCD 35. The wires (not shown) connecting the LCD 35 to the processor of the cutter 10 are extended through the arm 59 to protect and conceal the wiring.

As with the lower door 26, the upper door 24 is configured to be selectively opened by pressing the ON button 22 (see FIG. 1) of the machine 10. Pressing the ON button 22 releases latch 61, allowing the spring 63 to bias the door to an open position. Gears 65 and 67 cause the door 24 to open in a controlled and relatively slow manner. Again, the sections 24' and 24" are fastened together to form the door 24 as with threaded fasteners (not shown) engaging holes 69 and posts 71. The door 24 pivots about laterally extending posts 73 and 75 that are pivotally coupled to the body of the machine 10.

Figures 5A, 5B:
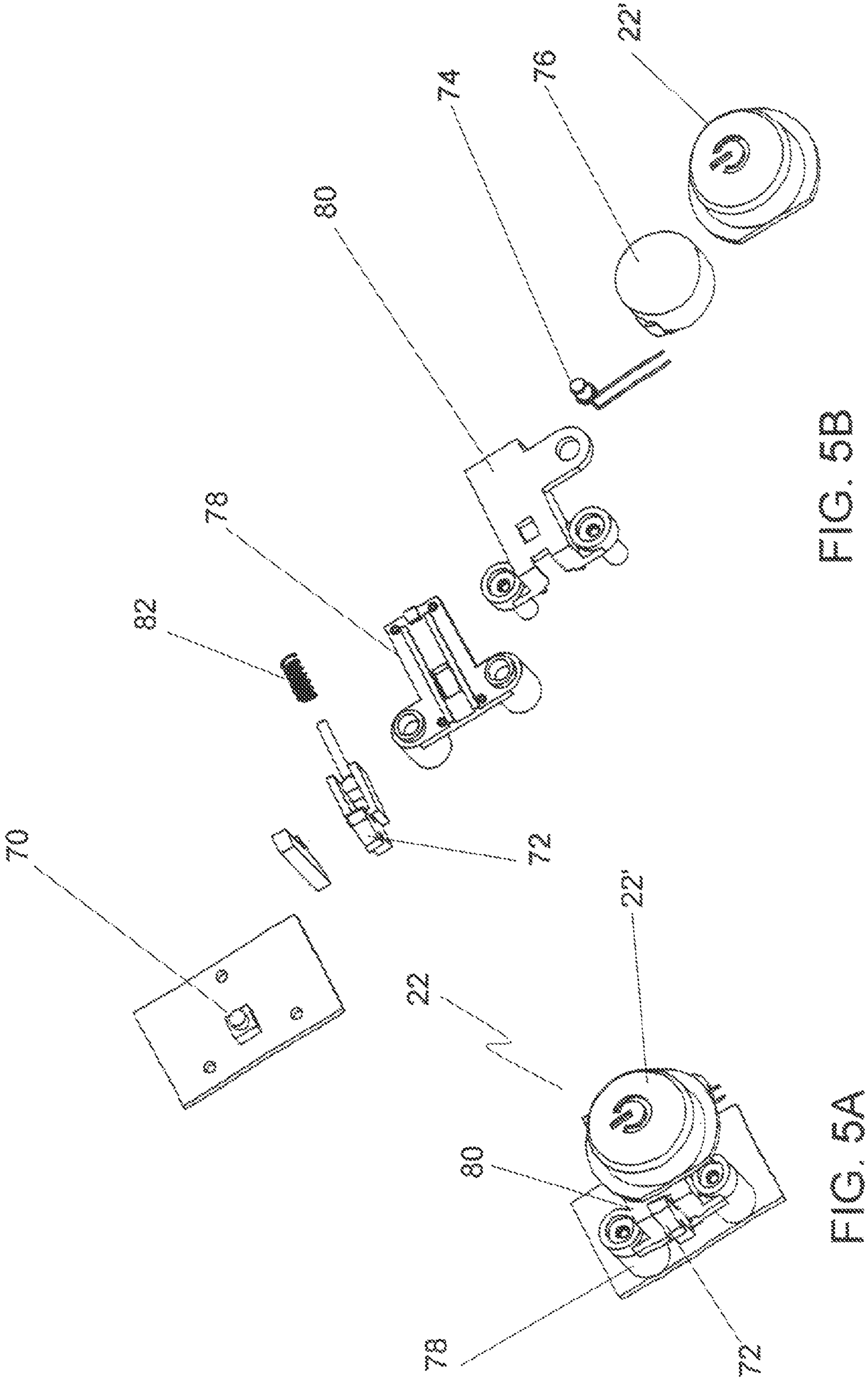
FIG. 5A is a perspective top view of an "ON" switch in accordance with the principles of the present invention.
FIG. 5B is an exploded perspective top view of the "ON" switch shown in FIG. 5A.

As previously discussed, as shown in FIGS. 5A and 5B, the ON-OFF/Open button assembly 22 not only activates a switch 70 to turn the machine on or off, but actuates a small latch 72 that is coupled to the button 22'. The button assembly 22 includes the button 22' that is back-lit with LED 74 through translucent lens 76. The latch 72 is held relative to the button 22' with the latch housing components 78 and 80. The latch 72 is biased by coil spring 82 into an engaging position. When the button 22 is pressed, the latch 72 is retracted to disengage with the latch components of the upper and lower door assemblies, causing the upper and lower doors to open.

Figure 3:
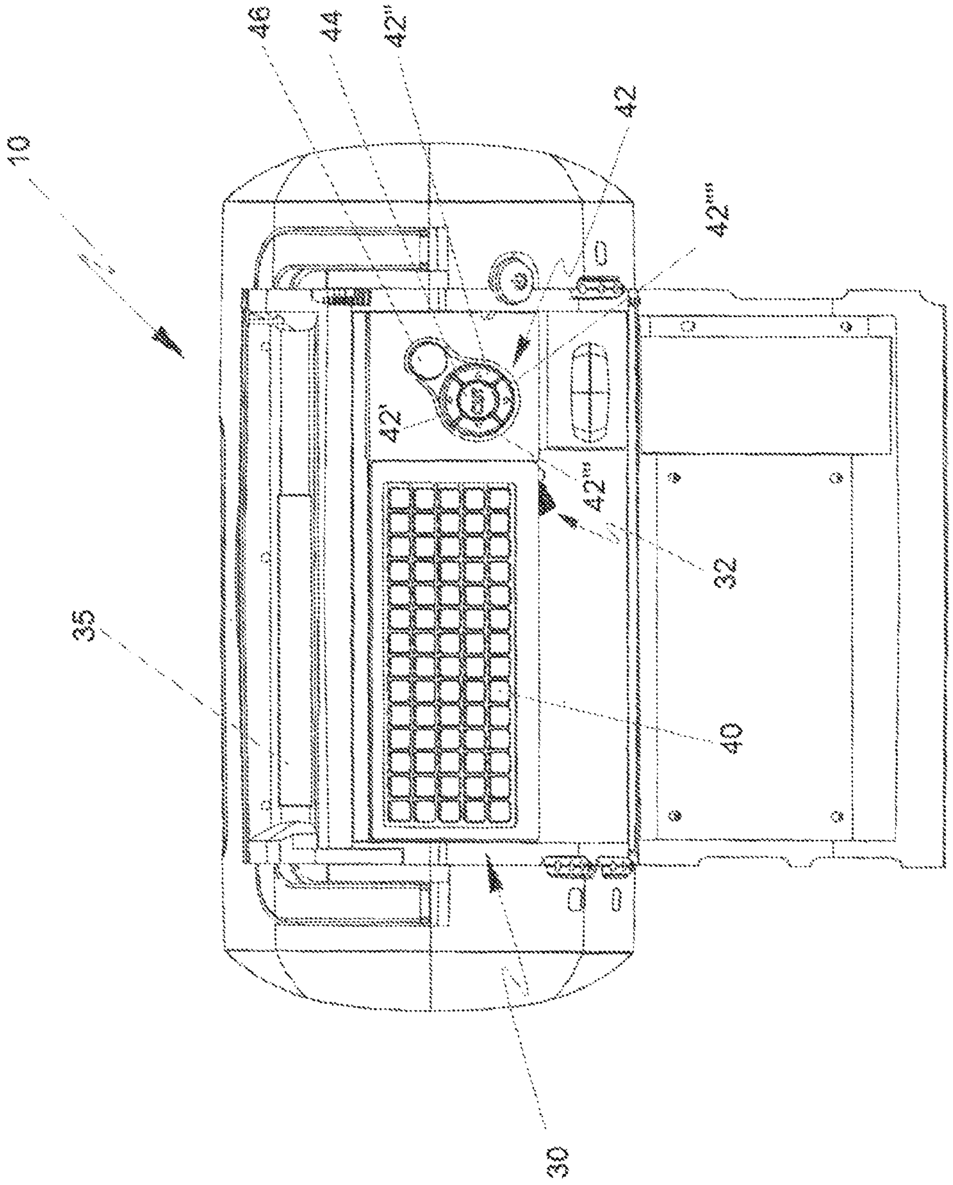
FIG. 3 is a top view of the electronic cutter shown in FIG. 2.

As further illustrated in FIG. 3, the user interface 30 includes a keyboard 40 and a plurality of buttons 42. Between the keypad 40 and buttons 42, a user can completely control the operation of the cutter 10. As such, there is no need to connect the cutter 10 to an external controlling device such as a personal computer in order to cause the cutter 10 to cut a selected image.

As will be described in more detail as illustrated in FIG. 2, the cutter 10 includes a memory storage device 50 for storing various shapes, such as fonts, images, phrases, etc., that can be cut by the cutter 10. In this embodiment, the memory storage device 50 is in the form of a removable and replaceable cartridge. The cartridge is provided with a particular library or set of shapes that can be selected using the keyboard 40. When a new set of shapes is desired, the cartridge 50 can be removed form its socket 52 and replaced with another cartridge containing the desired shape or shapes. In combination with a change of the cartridge 50, the keyboard 40 is provided with a removable and replaceable overlay 49 that is formed of a flexible material such as silicon rubber, PVC or other rubber-type materials to allow the keys of the keyboard 40 to be pressed when the corresponding raised keys of the overlay are pressed. The overlay may be formed from a clear, transparent or translucent material to allow light from the keys of the keyboard 40 to be seen through the overlay 49. In order to identify which overlay corresponds to a particular cartridge, the particular name of the font or image set (as well as the individual characters, phrases and functions) can be printed, as by silk screening or other methods, onto the overlay and the same name printed on the cartridge or printed on a label that is attached to the cartridge. Also, if desired, by matching the color of a particular keyboard overlay 49 with the color of a particular cartridge 50, a user can easily verify that they are using the correct cartridge 50/overlay 49 combination. For any given color or material from which the overlay is formed, the overlay is not completely opaque. Thus, as previously discussed, in order to signify to the user that a particular function key has been activated, such as CAPS or the like, an LED is positioned beneath the key to illuminate the key when activated. As such, by forming the overlay 49 from material that is at least partially translucent, the light from the LED is visible to the user through the overlay 49. Thus, both the keys of the keyboard and the overlay 49 are formed from an at least semi-translucent material.

Figure 4:
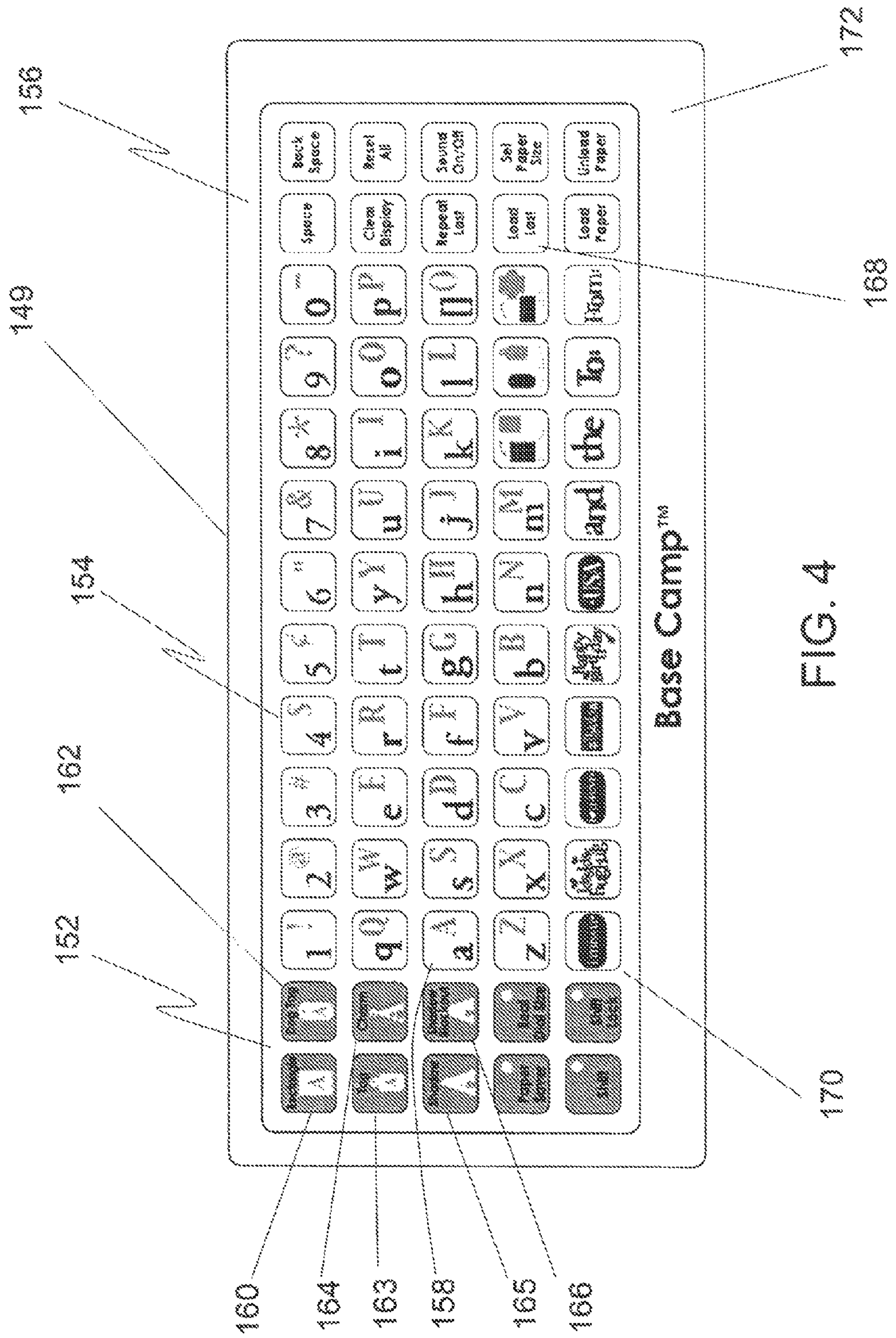
FIG. 4 is a top view of a keyboard overlay in accordance with the principles of the present invention.

As shown in FIG. 3, the user interface 30 includes a plurality of input keys in the form of a keyboard 40 set forth in an array of keys in 5 rows and 14 columns. Of course, more or less keys could be employed without departing from the spirit and scope of the present invention. As shown in FIG. 4, a particular keyboard overlay 149 is illustrated. The keyboard overlay provides a plurality of shape or image enhancement keys, generally indicated at 152, a plurality of image and font keys, generally indicated at 154 and a plurality of cutter control keys 156. The image and font keys 154 each provide a graphical representation of the fonts, characters and images that are available on a particular cartridge. In this example, for the character set entitled "Base Camp" shapes and a few pre-made phrases are provided. The image enhancement keys 152 provide various character altering features that can be performed to a particular selected image. Thus, for example, by pressing and selecting the letter "A" 158, various modifications or enhancements can be selected by pressing one or possibly more of the enhancement keys 152. The enhancement keys can enhance the letter "A" by adding various components to the letter, such as by surrounding the letter by a rectangle 160, a dog tag 162, a tag 163, a charm 164, and also modify the letter "A" by putting it in the form of a shadow 165, or a shadow blackout 166. In addition, various other modes can be selected such as "paper saver", "real dial size", "shift" or "shift lock". The cutter control keys 156 include such features as adding a space between characters typed by a user and "back space" when typing in a particular string of characters to remove the last character typed. Also, there are keys for clearing the display, resetting, repeating the last character, turning the sound feature of the machine on or off, setting the paper size, and loading or unloading the paper. It is also contemplated that all or a portion of these features can be selected by using the directional keys that surround the CUT button 44 (see FIG. 3) and selecting such features visually through the LCD display.

In addition, a "Load Last" key 168 is provided. The load last key 168 allows a user to reinsert a mat into the cutter after some material has been cut from the mat. That is, as will be described in more detail, as the machine cuts a particular image or set of images from a particular paper/mat combination, after the mat is removed to remove the shape that has been cut, a user has the option of reinserting the same mat with the remaining paper still attached thereto. By pressing the "Load Last" key, the cutter will have stored data to know the area of the mat that has already been cut. When the user selects a new character or shape to be cut, the cutter will automatically move the cutter head to an area of the paper that has not yet been cut. In addition, the cutter will know if the particular character or shape to be cut of a particularly selected size will fit in the remaining paper. If the character or shape selected by the user is too large to be cut from the remaining paper, the cutter will alert the user by a visual and/or audible alarm, such as a beep and a message on the display of the cutter that the image is too large.

Each key 152, 154 and 156 of the overlay 149 is raised above the base surface 170 with the back surface (not shown) of each key 152, 154 and 156 forming a recess for receiving therein a keyboard key. As such, when placed over the keyboard of the cutter, the overlay 149 will self-align so that it is properly positioned over the appropriate keys. The outer rim 172 of the overlay 149 also seats onto the keyboard to ensure that the overlay is properly positioned and that the overlay cannot be misaligned with the underlying keypad.

Referring again to FIG. 3, a plurality of buttons principally provide control of the cutter assembly. That is, the four arrow buttons 42', 42", 42'" and 42"" can be used to cause movement of the cutter assembly 32 to a particular location on the mat (not shown). Thus, the user can selectively control the position of the blade by using the four arrow buttons to move the blade to a specific location over the material to be cut. This is especially helpful if the user is cutting on an odd shaped piece of paper or on a sheet of paper where a selected cut is desired at a specific location. Thus, the user can selectively choose the location on the sheet where a selected cut will begin. Once properly positioned and the desired image selected with the user interface 30, the cutter 10 is instructed to cut the selected shape by pressing the "CUT" button 44. If necessary, during a particular cutting sequence the cutting process needs to be halted, a user can press the stop button 46 located proximate the cut button.

Figure 6:
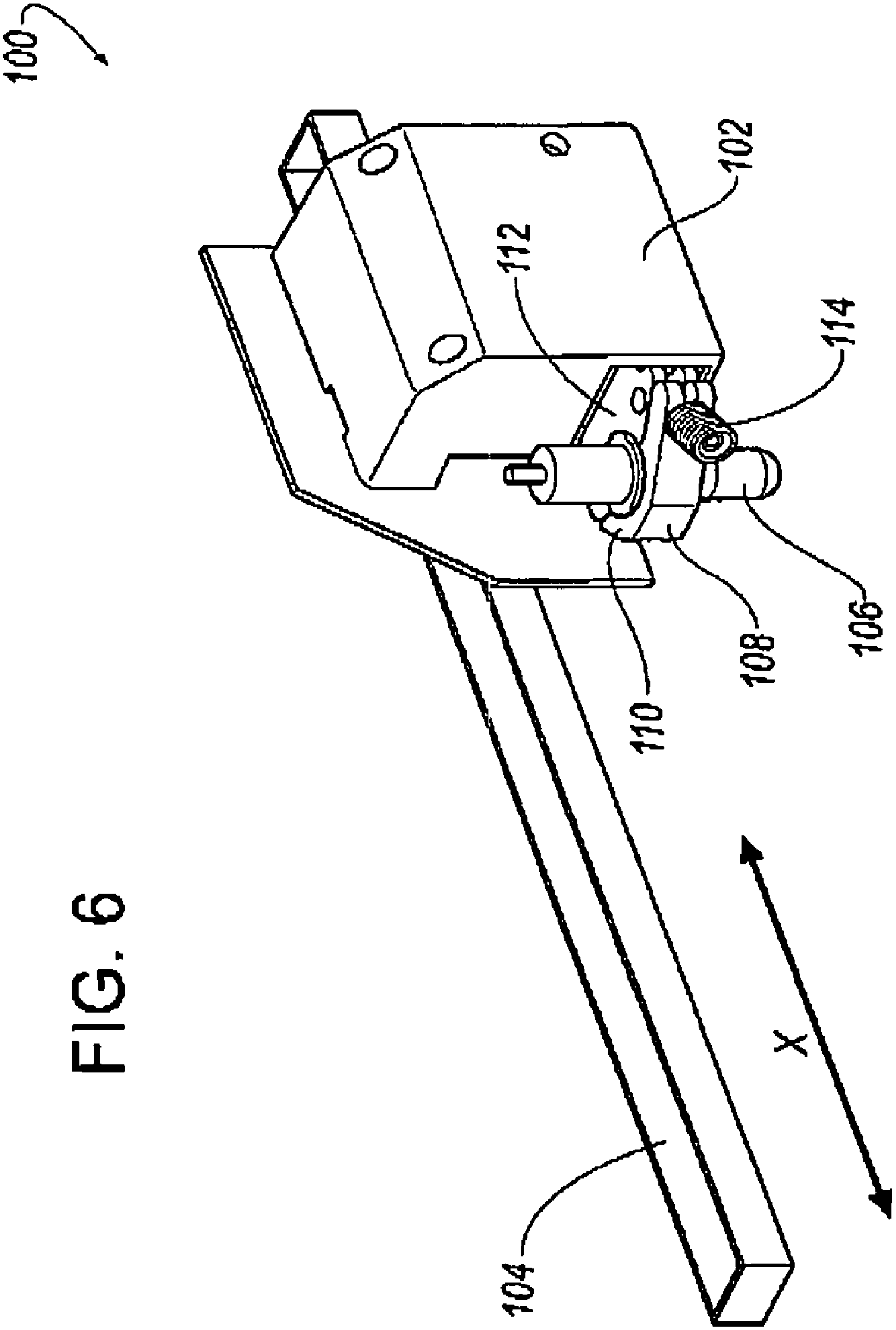
FIG. 6 is a perspective front view of a cutter assembly in accordance with the principles of the present invention.

Referring now to FIG. 6 is a cutter assembly, generally indicated at 100, in accordance with the principles of the present invention. The cutter head unit 102 moves from side-to-side relative to the cutter 10 in the X direction, as shown by arrow X. Movement of the head unit 102 is controlled by a stepper motor (not visible) housed within the head unit 102 to move the head unit 102 along the rail 104. Coupled to the head unit is the blade holder 106 that retains a blade (not visible) for cutting the desired material. The blade holder is removably coupled to the head unit 102 with a releasable clamp mechanism 108 comprised of a first pivotable clamp portion 110 pivotably coupled to a second stationary clamp portion 112. The two are releasably held together with threaded fastener 114. The clamp mechanism 108 prevents vertical movement of the blade holder 106 relative thereto by engaging with the blade holder in a vertically abutting manner. The blade holder 106 is configured to be easily removable by a user so that the user can replace the blade when it becomes too dull to properly cut or to adjust the amount of the blade that extends from the blade holder to accommodate materials of different thicknesses.

In addition to coupling and supporting the blade holder 106, the head unit 102 houses a solenoid (not visible) that is coupled to the clamp portion 112 that supports the blade holder 106. The solenoid controls the amount of pressure that the blade applies when cutting. The solenoid also controls the vertical movement of the blade holder 106 when lifting the blade away from the material to allow the blade to move to a new cutting position without cutting. The pressure applied by the solenoid to the blade can be adjusted by the user with one of the dials shown in FIG. 1. Such pressure adjustment may be required to properly cut a given material. For example, a pressure setting to cut a sheet of regular paper may not be adequate to cause a proper cut into thick card stock. As such, the pressure may need to be increased. Conversely, the pressure necessary to cut through thick card stock may cause the blade to tear a regular sheet of paper if a cut is attempted at too high of a pressure setting.

Figure 7:
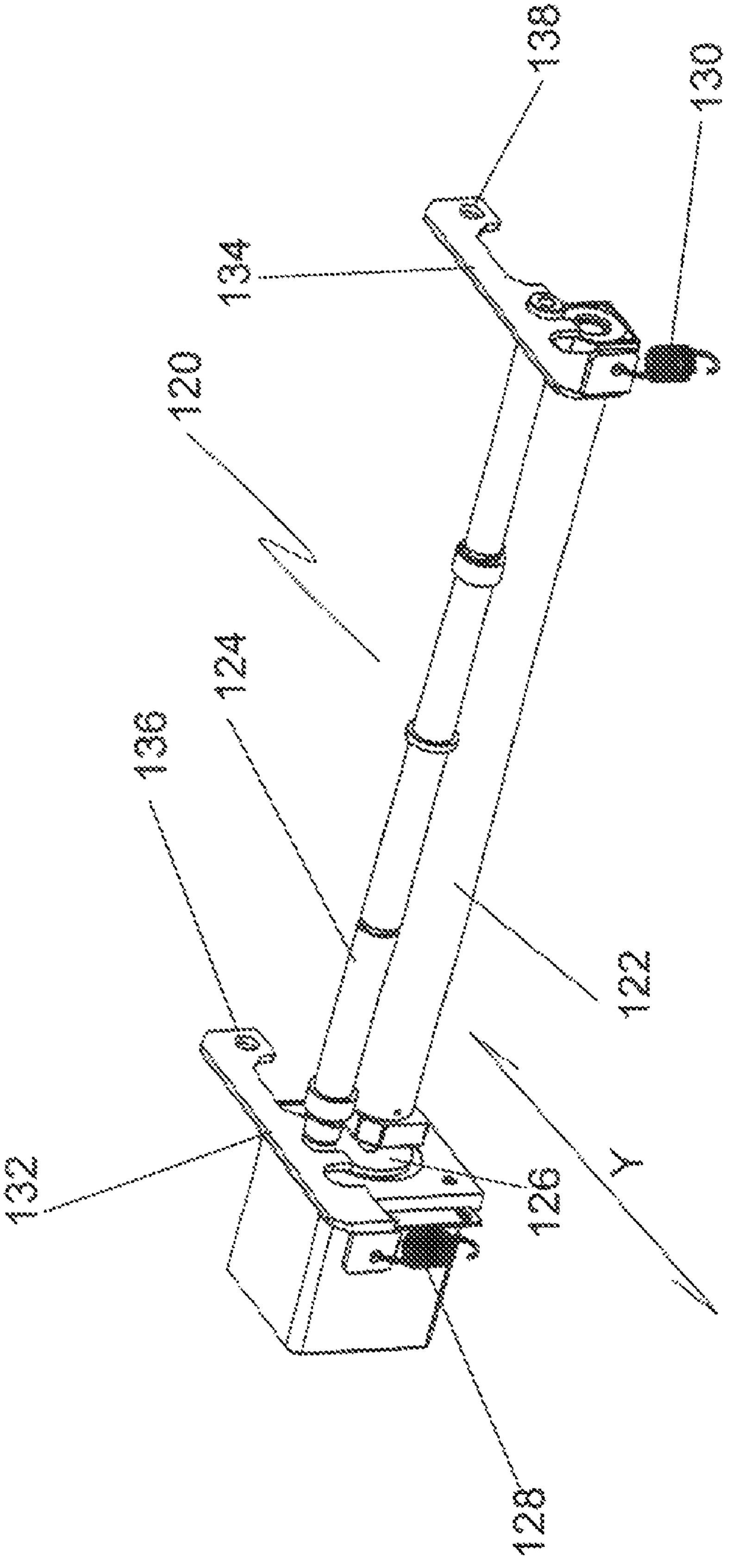
FIG. 7 is a perspective front view of a roller assembly in accordance with the principles of the present invention.

As shown in FIG. 7, a roller assembly, generally indicated at 120, is used in combination with movement of the blade holder to cause a cut of a particular shape and size. The roller assembly 120 is comprised of a pair of rollers 122 and 124 that engage the material being cut to move the material in a Y direction that is substantially perpendicular to the X direction shown in FIG. 6. The material being cut is fed through and between the rollers 122 and 124 such that during a cutting sequence the rollers 122 and 124 can control the Y position of the material, as indicated by arrow Y. The roller 122 constitutes the drive roller as it is driven by a stepper motor 126 with the shaft of the motor coupled to the drive roller 122. The drive roller 122 may have a texture applied thereto to cause a gripping action between the roller 122 and the material being cut or the mat to which the material being cut is temporarily attached. The biasing roller 124 maintains the material (and mat) being driven by the drive roller 122 in contact with the drive roller 122 as the drive roller 122 rotates. The biasing roller 124 is biased by springs 128 and 130 relative to and toward the drive roller 122. This biasing feature allows the two rollers 122 and 124 to accept materials of different thicknesses to be inserted between the rollers 122 and 124. The roller 124 is thus rotatably attached to pivoting mounting brackets 132 and 134 that pivot about apertures 136 and 138 that are pivotably coupled to the machine with the springs 128 and 130 allowing biased pivotal movement of the mounting brackets 132 and 134.

The processor of the machine controls movement of the stepper motors that control the drive roller 122 and the cutter head 102 to coordinate movement of the material being cut and the blade in a manner that produces a programmed cut. Because the rotational movement of the stepper motors can be precisely controlled, a precise cut can be made.

Figure 8B:
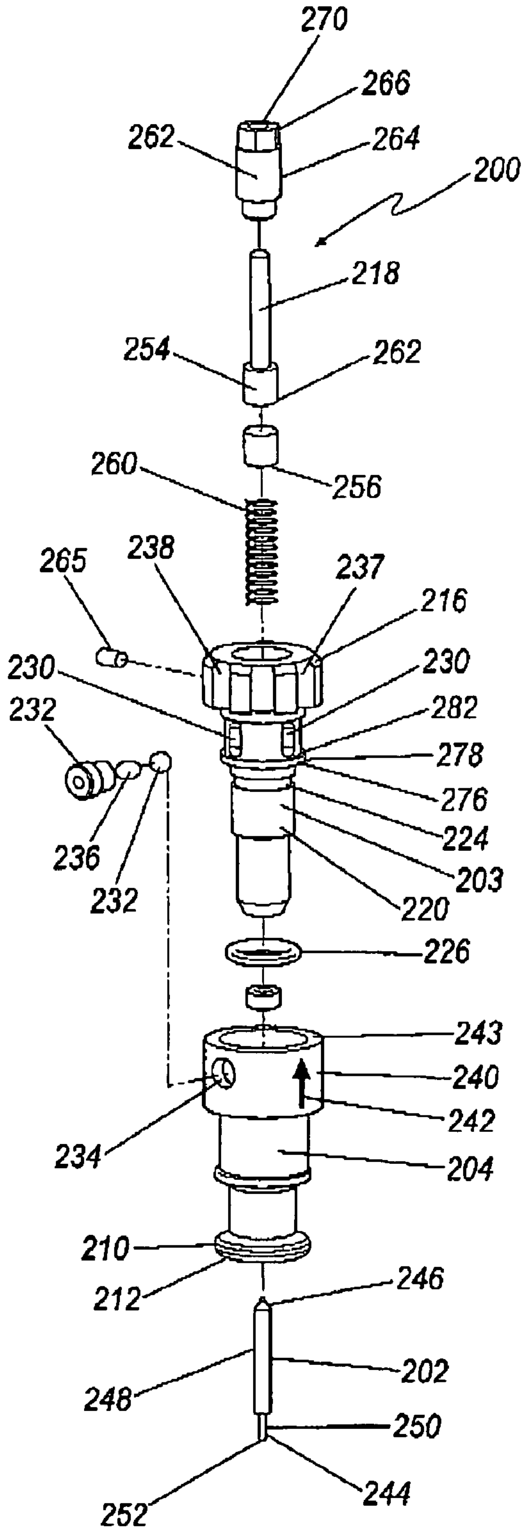
FIG. 8B is an exploded perspective view of the blade holder shown in FIG. 8A.
Figure 8C:
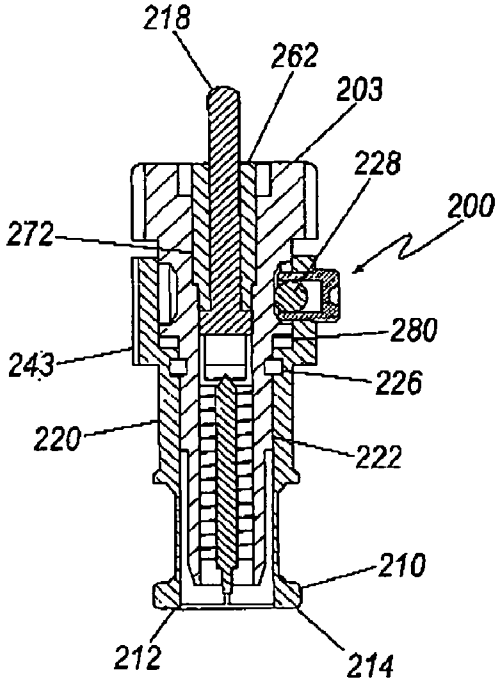
FIG. 8C is a cross-sectional side view of the blade holder shown in FIG. 8A.
Figure 8A:
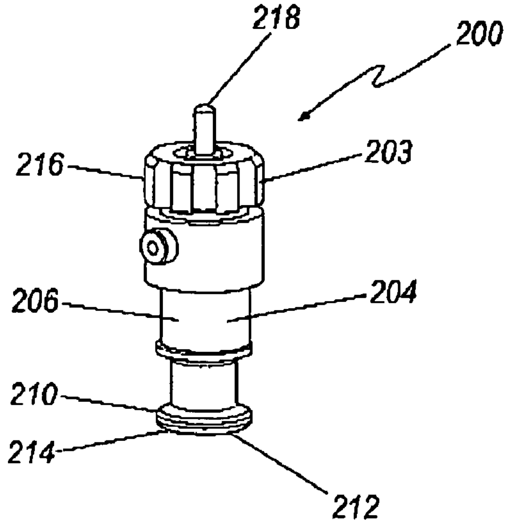
FIG. 8A is a perspective side view of a blade holder in accordance with the principles of the present invention.

A blade housing, generally indicated at 200, in accordance with the principles of the present invention is illustrated in FIGS. 8A, 8B and 8C. The blade housing 200 supports and retains the blade 202 therein relative to the cutting machine and also provides the capability of an easy factory adjustment of the blade 202 relative to the inner housing 203 as well as easy and controlled blade adjustment of the blade 202 relative to the outer housing 204 to allow the user to adjust the depth of cut.

Figure 8D:
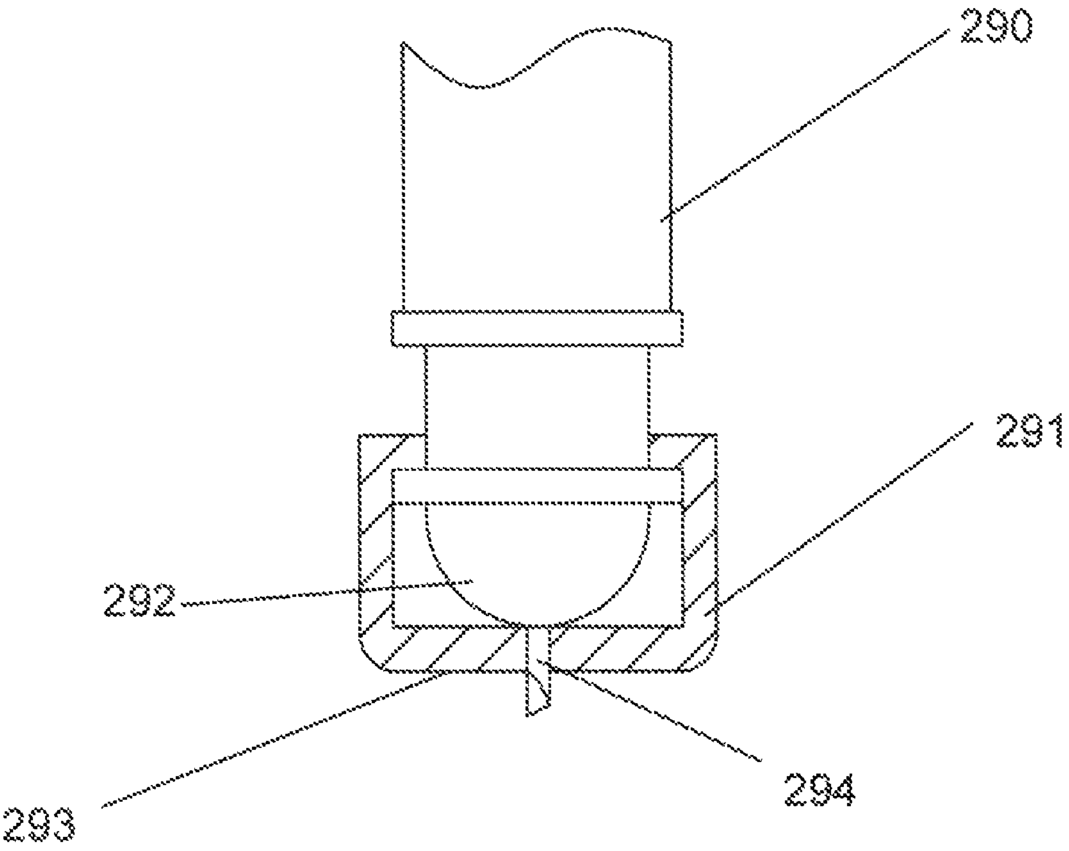
FIG. 8D is a partial cross-sectional side view of an alternative embodiment of a blade holder in accordance with the principles of the present invention.

The blade holder 200 is configured to be held in the head assembly of the cutter. A circumferential channel 206 is provided in the outer housing 204 for retaining the blade holder. The distal end 210 of the outer housing 204 defines a relatively flat bottom surface 212 over a substantial portion thereof. The use of a flat nosed end 210 is a substantial improvement over the generally curved ends of prior art blade holders. In particular, the flat nosed end 210 holds the material being cut while the blade moves through the material. The flat nosed end 210 also includes a radiused lower edge 214 that transitions into the flat surface 212. Of course, the lower edge 214 could be formed from a bevel as well. The bottom surface 212 has sufficient surface area so as to allow the lower surface to ride on and glide along the material being cut without catching and lifting any of the material already cut. In addition, as the blade 202 cuts through the material, the lower surface 212 holds the material around the blade to allow the blade 202 to cut the material without tearing it. As shown in FIG. 8D, it is also contemplated that a rounded end prior art cutter 290 configuration could be employed with a generally flat foot 291 secured relative to the rounded end 292, somewhat similar to a foot on a sewing machine that surrounds the needle, to form a flat surface 293 through which the blade 294 would extend in a similar manner to the flat nosed end 210. Thus, while the flat nosed end 210 of the present end is illustrated as being an integral component of the outer housing 204, it is also contemplated that it could be a separate component attached thereto.

The blade housing 200 also allows adjustment of the blade 202 relative to the outer housing 204. This is accomplished by rotating the inner housing 203 relative to the outer housing 204 by grasping and turning a blade height adjustment knob 216 that is integrally formed with the inner housing 203. The engagement of the inner housing 203 with the outer housing 204 is such that the amount of relative rotation between the two is limited in both directions. In the embodiment shown in FIG. 8A, the adjustment knob 216 can rotate relative to the outer housing approximately one full revolution to adjust the blade 202 from its minimum amount of protrusion beyond the bottom surface 212 to its maximum. In order to accomplish such a rotational adjustability, the inner and outer housings 203 and 204 are in threaded engagement with the pitch of the threads determining the relative movement of the two for any given amount of relative rotation. For example, one-quarter turn could adjust the blade approximately 0.5 mm. By having four set points in 360 degrees of rotation, the blade's depth of cut could be increased a total of 2 mm in one full revolution of the adjustment knob 216. Of course, more or less set points could be provided to provide various levels of adjustability.

A plunger 218 extends from the adjustment knob 216 to force the blade 202 out of the distal end 210 of the housing 200 a sufficient amount to be grasped by a user. The blade 202 can then be pulled from the housing 200 and removed. Replacement of the blade 200 is accomplished by inserting another blade 202 into the housing 200. No other adjustment is necessary.

As shown in FIGS. 8B and 8C, the housing 200 is comprised of the inner and outer housings 203 and 204. The inner housing has an externally threaded portion 220 for mating with and threadedly engaging internal threads 222 formed on the inside of the outer housing 203. An o-ring 226 is interposed between the inner and outer housings 203 and 204 and is seated within the circumferential channel 224 of the inner housing. The o-ring provides rotational resistance between the inner and outer housings 203 and 204.

In order to provide discrete set points of rotation between the inner and outer housings 203 and 204, a snap bearing 228 is biased into engagement with a plurality of detents or recesses 230 formed in the outer surface of the inner housing 203. The snap bearing 228 is a metal sphere having a radius that is greater than the depth of the plurality of recesses 230. The radius of the recess 230 is configured to be substantially similar to the radius of the bearing 228. An externally threaded bearing housing 232 is configured to threadedly engage with threads in the side bore 234 of the outer housing 204. A coil spring 236 is interposed between the bearing housing 232 and the snap bearing 228 to bias the snap bearing 228 into the recess 230. As such, as the inner housing is rotated, the bearing 228 will "snap" into a particular recess 230 when the recess 230 is properly aligned with the bearing 228. As such, when engaged with the recess 230, the bearing 228 will hold the relative positions of the inner and outer housings 203 and 204 at a particular selected discrete set points. Thus, the depth of cut of the blade 202 can be precisely controlled for a given set point with the engagement of the bearing 228 to the recess 230. In order to provide a visual indicator of the position of the inner and outer housings 203 and 204, and thus, the position of the blade 202, the adjustment knob 216 is color coded with a particular color of paint or other suitable material coating the vertical channels 237 and 238 that are circumferentially aligned with a particular recess 230. Likewise, other indications may be provided on the adjustment knob to provide an indication of the relative position between the inner and outer housing. The upper portion 240 of the outer housing 204 is provided with an alignment mark 242 on the outside thereof. By aligning the mark 242 with a particularly colored channel 237, the amount of the blade 202 extending from the end 210 of the outer housing 204 will be precisely set. Alternatively, a vertical marker 243 constituting a vertically oriented channel may be formed in the upper portion 240. Again, the vertical marker 243 is aligned with one of the recesses 230. Furthermore, numbers may be printed or formed on the raised portions of the adjustment knob to which the alignment mark 242 can be positioned.

The blade 202 is provided with a sharp cutting end 244 at its distal end and a conically shaped proximal end 246. The body 248 of the blade is cylindrical in shape to provide stable and controlled, but free rotation of the blade 202 relative to the inner housing 203. The cutting end 244 is tapered to provide a leading edge 250 and a trailing edge 252. As such, the blade 202 can freely swivel within the housing 203 and will self orient with the leading edge 250 oriented in the direction of the cut.

The blade 202 is releasably coupled to the inner housing 203 by magnetic force supplied by the magnetic blade stop 254. The blade stop 254 provides a bearing surface for engaging the conical end 246 of the blade 202 to allow free rotation of the blade 202 while retaining the blade 202 with the magnetic force. The longitudinal axis of the body 248 of the blade 202 is linearly and concentrically aligned with the longitudinal axis of the housing 203 with blade bearing 258 positioned adjacent the distal end of the housing 203.

In order to decouple the blade 202 from the housing 203, a plunger 218 is provided. The plunger 218 is longitudinally moveable relative to the housing 203 and is biased toward the proximal end of the housing 203 with the coil spring 260. The distal end 262 of the plunger 218 provides an abutment for the magnetic blade stop 254. Thus the position of the distal end 262 relative to the housing 203 determines the position of the blade 202 relative to the housing 203 and the longitudinal position of the housing 203 relative to the outer housing 204 determines the length of the distal end 244 of the blade 202 extending from the surface 212 of the flat nosed end 210.

In order to ensure that the position of the blade end 244 relative to the housing 203 is properly set at the factory, given the fact that variations in component dimensions due to factory tolerances could result in variations in the blade end 244 position relative to the end 212 for a given set point, a factory adjustment member 262 is provided. The member 262 is provided with an externally threaded portion 264 for engaging with threads on the inside surface of the housing. The top portion 266 of the member is provided with a hex head for being turnable with a socket having a similar size. The member forms a sleeve around the plunger 218 to allow the plunger 218 to slide relative thereto. By threading the member 262 into the housing 203, distal end 262 of the plunger 218, which is wider than the longitudinal bore 270 of the member 262, is forced into the top end of the housing 203 a distance equivalent to the distance into the housing 203 that the member 262 is threaded. As such, at the factory, the member 262 can be threaded into the housing 203 until the blade end 244 is coplanar with the surface 212 of the housing 204. The set screw 265 can then be threaded into the side of the housing 203 through the knob 216 to hold the set position of the member 262 relative to the housing 203. Thus, each blade 202 can be properly longitudinally positioned with the housings 203 and 204 so that adjustment by rotation of the knob 216 will cause the same displacement of the blade for each blade housing 200.

As shown in FIG. 8C, the housing 203 includes an internal bore 272 having two different diameters. The interface between the upper larger diameter portion and lower smaller diameter portion provides an abutment for engagement with the adjustment member 262, which is the maximum insertion of the adjustment member 262 relative to the housing 203. As illustrated, a small gap between the adjustment member 262 and interface is shown.

When the blade holder 200 is fully assembled as shown in FIG. 8C, the relative adjustment of the first inner and second outer housings 203 and 204 is limited in both directions such that a limited number of adjustment positions is provided. In the present embodiment, the number of "snap" positions is limited to four as a result of the limitation of one full rotation of relative movement between the first and second housings 203 and 204. Of course, more "snap" positions could be provided by increasing the number of detents in the inner housing. As the first and second housings 203 and 204 are rotated into closer engagement, rotation is stopped by the bottom surface 276 of the circumferential raised portion 278 (see FIG. 8B) abutting the inside surface 280 of the housing 204. In the opposite direction, as the first and second housings 203 and 204 are rotated away from each other, the ball housing 232 extends through the side wall of the housing 204 and protrudes therein to provide an abutment. As such, the top surface 282 of the protrusion 278 will abut the ball housing 232 to prevent further relative rotation of the first and second housings 203 and 204.

Figure 14:
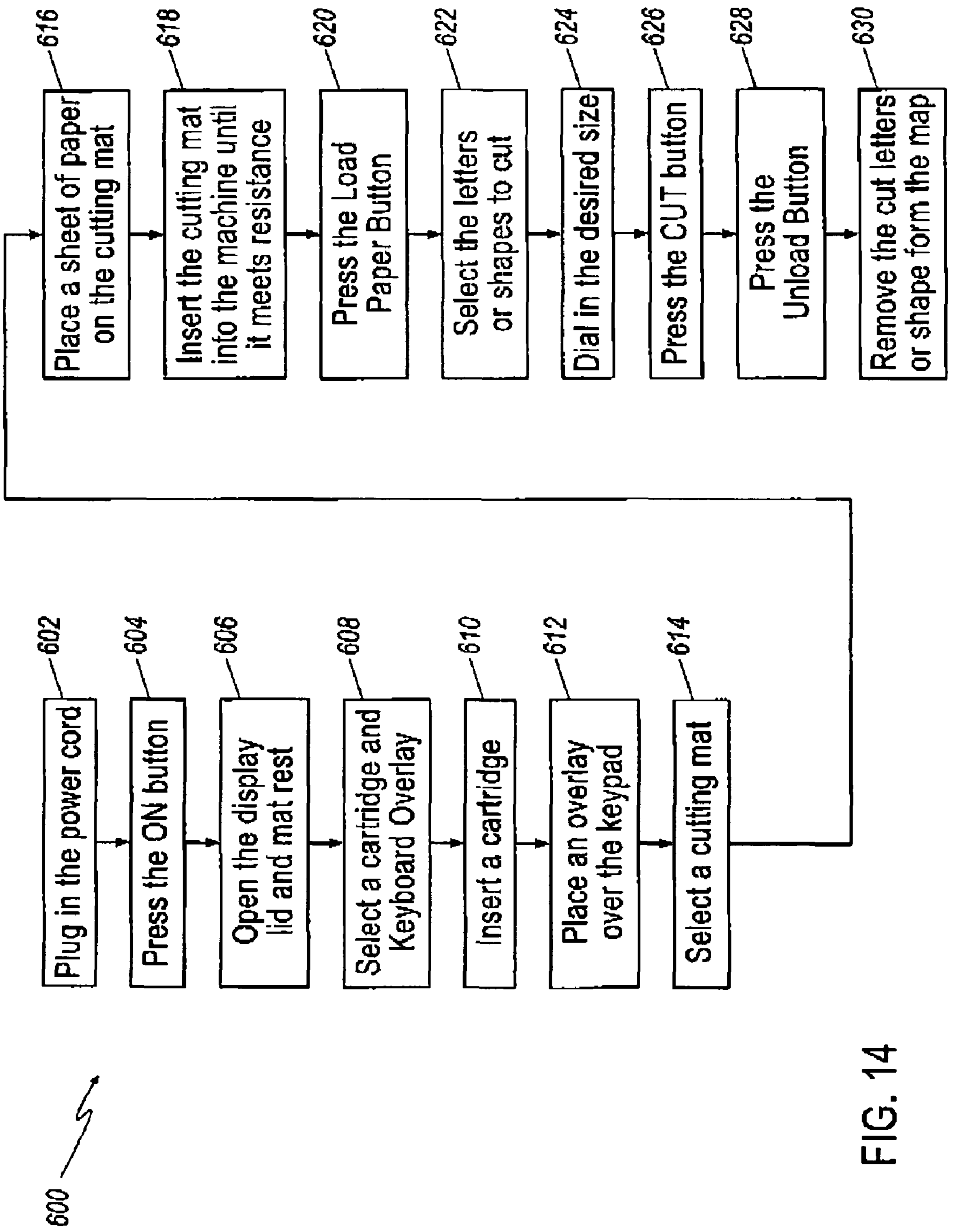
FIG. 14 is a schematic block diagram of a method of operating an electronic cutter in accordance with the principles of the present invention.

In operation, the cutter as illustrated in FIGS. 1, 2 and 4 is simple to operate. FIG. 14 is a schematic illustration of a method, generally indicated at 600, of operation of an electronic cutting machine according to the present invention. Since the cutter is an electronic appliance, a user power cord is plugged in 602. By pressing 604 the ON button 22, the machine power is turned on and the doors 24 and 26 open. The user may need to open 606 the display lid and mat rest. A particular cartridge 50 and keyboard overlay 49 are selected 608. The cartridge 50 is inserted 610 into the socket 52 and the corresponding keyboard overlay 49 is placed 612 over the keyboard 40. The overlay 49 indicates the specific content and features of the letter or image set contained on the corresponding cartridge 50. The user then selects 614 the cutting mat and places 616 a sheet of paper on the cutting mat.

Figure 9:
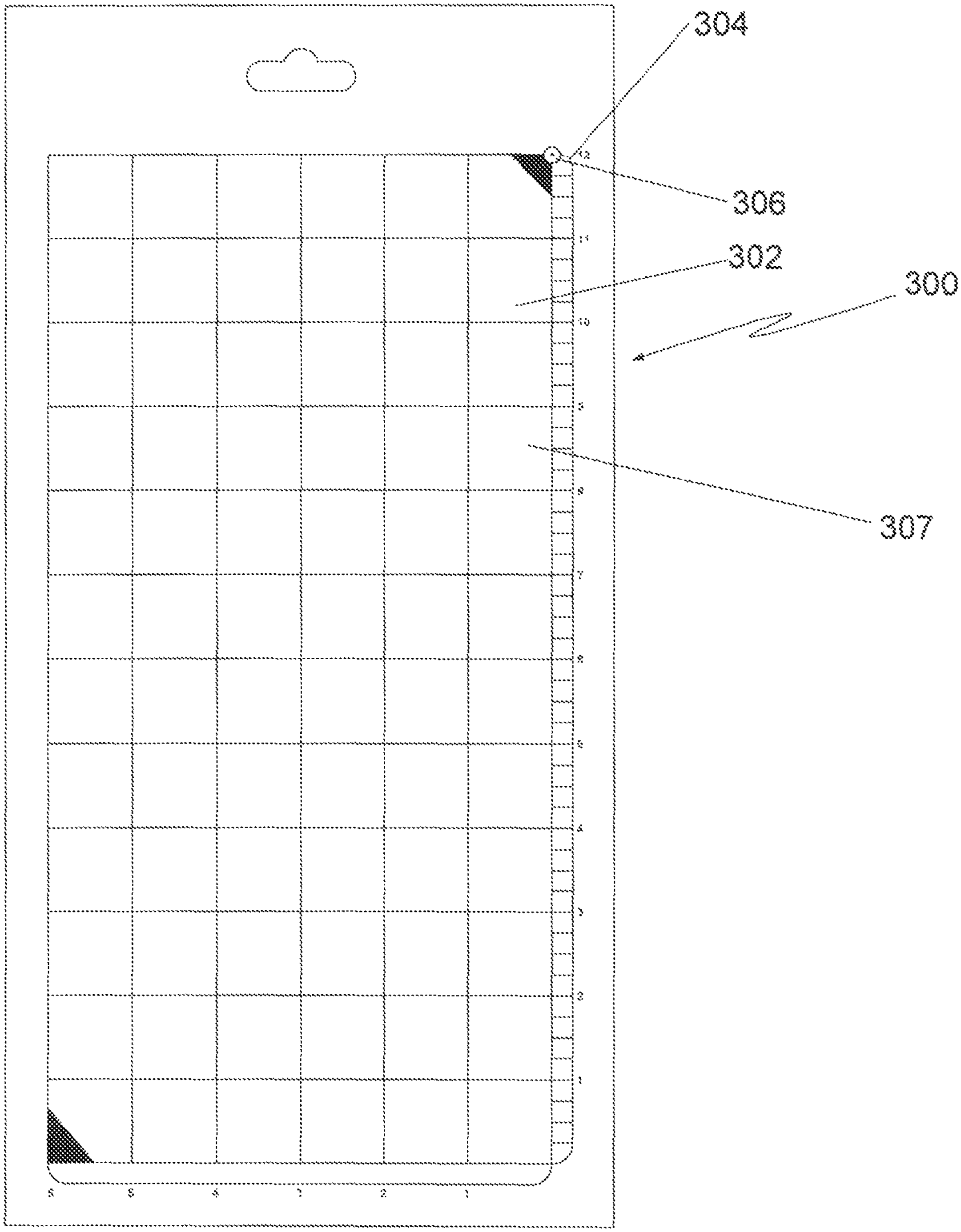
FIG. 9 is a top view of a mat in accordance with the principles of the present invention.

As shown in FIG. 9, a cutting mat 300 is employed to hold the paper or other material in sheet form to be cut with the cutter 10. The mat 300 is configured to hold a sheet of paper that is six inches wide and twelve inches long. The gridded surface portion 302 of the mat 300 is coated with a layer 307 of releasable adhesive that can hold the paper thereto while being cut, but will not permanently bond to the paper to allow the paper to be removed from the mat. The grid lines on the gridded surface portion 302 provides alignment features for positioning of a sheet of paper thereon. By only coating the portion of the mat with adhesive where the paper to be cut is applied, adhesive from the mat is not transferred from the mat to the components of the cutter rollers as the mat is moved by the cutting machine. Essentially, the mat 300 includes a "tacky" surface that will allow multiple uses before the adhesive looses its effective bonding capability. In the upper right hand corner 304 of the mat 300 is a blade alignment indicator mark 306. The mat 300 with a six by twelve inch sheet of paper attached thereto is fed into the cutter 10.

Again referring to FIG. 14, much like inserting a sheet of paper into a typical printer, the mat is inserted 618 into the machine between the rollers until it meets resistance. The "Load Paper" button on the overlay 49 is pressed 620 and the mat is automatically fed into the machine and the blade will move to the upper right hand corner 304 of the mat. Thus, the machine is capable of automatically loading the paper to be cut by pressing a single button that loads the paper and moves the blade to the starting point. As such, the machine knows precisely where it is at relative to the paper to be cut. As discussed herein, the arrow buttons can also be selected to adjust the position of the blade if necessary. The letters or shapes to be cut are selected 622 by typing them out on the keyboard 40. The characters and/or shapes will be displayed on the LCD display 35. Once the desired characters and/or shapes have been selected 622, the user can dial in 624 the desired size of the images to be cut. The user then presses 626 the "CUT" button and the cutter will begin cutting the selected images. When the cutting process is complete, the blade housing will return to the starting point and the user can press 628 the unload button and the machine will eject the cutting mat. The images that have been cut can then be removed 630 from the cutting mat.

In order to modify the characters printed on the keyboard overlay, as previously discussed, certain functions are provided to allow for customization of the images to be cut. The "Shift" button can be used to select the upper character key (shown in gray in FIG. 4) (e.g., the upper case of a particular letter), while the "Caps" button will lock the keyboard to select all upper gray characters when the corresponding key is pressed. Similar to a typical computer keyboard, "Back Space" deletes the last entered selection and "Space" inserts a space between characters. The "Clear Display" key clears the LCD display and the "Reset All" key button resets the machine to clear any previous selections including selected character features from keys 152. If multiple cuts of the same character or selected characters are desired to be repeated, the "Repeat Last" key can be selected. Also, the paper size can be modified if one is not using a six by twelve inch sheet.

As previously discussed, a user can easily modify the size of the character being cut by dialing the desired size with the appropriate dial. In order to keep the size of letters of a particular font consistent, the size is automatically adjusted in proportion to the largest possible character contained in the given font set. If one desires to deviate from this proportional scaling of sizes, the "Real Dial Sizing" key can be selected to cause the size of the particular character to be equal to the selected size. For example, if the letter "a" is selected to be cut, without "Real Dial Sizing" being selected, the letter "a" (small) would be proportionately sized to match the font size of "A" (capital). If "Real Dial Sizing" is selected, the letter "a" would be cut the same size as the letter "A". When all of the desired characters or images are selected, the user will press the "Cut" button and the cutter 10 will cut the shapes. The feature buttons 52, allow custom feature effects for each set. Such features can vary with each specific cartridge to add various elements of expansion and versatility. For a given feature to be selected, the user need only press the desired feature button after selecting a desired character or image to which the feature will apply. Thus, the character may be modified as shown on a particular overlay by pressing the button on the overlay that corresponds to the desired feature.

In order to decrease the memory required to store a particular font, character, shape and/or image set on a given cartridge and thus decrease the cost of each cartridge, the images and fonts are stored as algorithms. As such, by storing a single algorithm for each character, image or feature, sizing is a simple matter of applying a multiplying factor to the particular algorithm that represents that character, feature or image. As such, there is no need to store separate images of each size on the cartridge. Thus, the ability to modify the size of a character with an added feature is a simple scaling of the algorithm for that feature/character combination and again does not require storage of each feature/character combination with a different feature added thereto (e.g., outlining, shading, underlining, etc.). As such, the fonts, characters and images stored on the cartridges of the present invention are resolution independent with the algorithms representing a series of straight lines and/or curves in a particular sequence. For higher resolution images, more individual line or curve segments are included.

The blade adjustment arrow keys that surround the CUT button allow the user to move the blade to any desired location on the mat. Such blade adjustment is often needed to allow the cutter to cut an image at a desired location on a given sheet of paper. The machine, however, is quite sophisticated in its ability to not only know if a particularly selected character and size will fit on a selected size of paper, but knows what it has cut from a particular sheet of paper and whether a newly selected shape for being cut will fit on the remaining paper. For example, when a user cuts a first image from a sheet of paper attached to the mat, the user can press the Unload Paper key and remove the shape that has been cut. The mat can then be reloaded back into the machine for additional cutting with the paper that is remaining by pressing the Load Last key 168. The user would thus press the Load Last key 168, select a new shape to cut and press the CUT button. Until reset, the machine will store in memory the shapes that have previously been cut and their location on the mat. When the user selects a new character or shape to be cut and presses the Load Last key 168, the cutter will automatically move the cutter head to an area of the paper that has not yet been cut for cutting the next shape. In addition, the cutter will know if the particular character or shape to be cut of a particularly selected size will fit in the remaining paper. If the character or shape selected by the user is too large to be cut from the remaining paper, the cutter will alert the user by a visual and/or audible alarm, such as a beep and a message on the display of the cutter that the image is too large. The user will then have the option of downsizing the character to fit or replacing the paper on the mat to accommodate a cut of the desired size.

Figure 15:
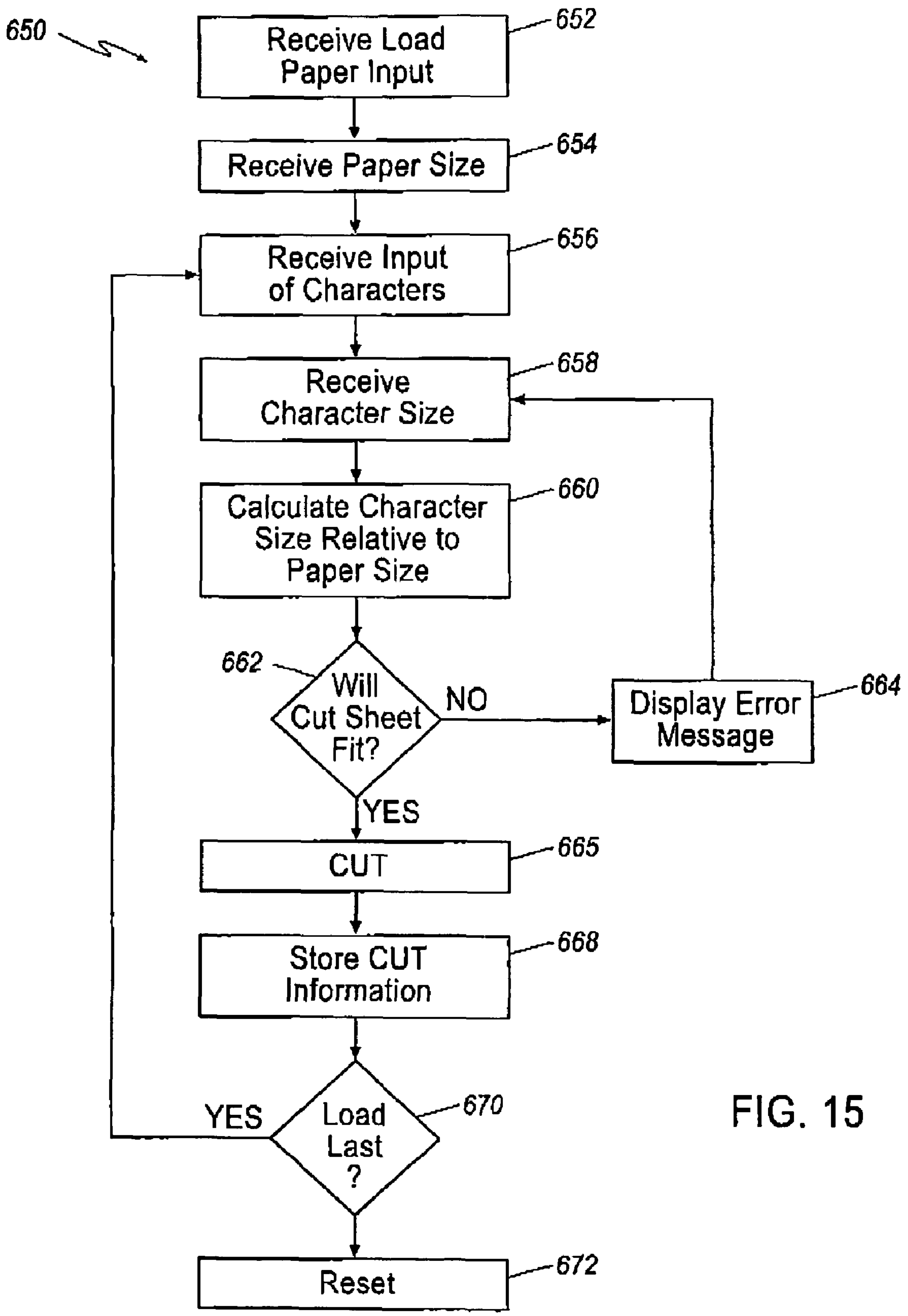
FIG. 15 is a schematic block diagram of a method of determining whether a cut will fit on a sheet in accordance with the principles of the present invention.

As shown in FIG. 15, the machine of the present invention is capable of determining whether a particular selected character, image or series of characters and images will fit on the paper to be cut or the remaining paper after a cut has already been performed. As shown in FIG. 15, a method, generally indicated at 650 of determining whether a selected cut will fit is illustrated. Initially, the machine will receive 652 a Load Paper input from the user, after which the paper is loaded into the machine. Next, the user may input the size of the paper being cut and the machine will receive 654 this information. Alternatively, the paper size will be the default size of, for example, six inches by twelve inches. The user will then input and the machine will receive 656 the characters, images or other shapes to be cut using the user interface keyboard as previously discussed. The user will then select and the machine will receive 658 the size of the image(s) to be cut. The machine will then calculate 660 the selected character(s) or shape(s) size(s) relative to the size of the paper or remaining paper. When the user presses the CUT button, the machine will determine 662 whether the selected cut will fit on the sheet. If not, the machine will display 664 an error message and/or sound an alert and wait to receive 658 an acceptable size of selected characters or images. If the size of selected images will fit on the paper or remaining paper, the machine will cut 665 the image(s). The machine then stores 668 the CUT information of the image(s) that have been cut. After the user has removed the cutting mat by pressing the "Unload Paper" button and removed the cut image(s) from the cutting mat, the user can reinsert the cutting mat with the remaining paper on the mat back into the machine. Once inserted, if the user presses the "Load Last" 670 button, the machine will recognize that the user is attempting to cut again on the same sheet of paper and use the stored CUT information to calculate whether the next set of characters or images to be cut will fit on the sheet. This feature will also allow the user to load the page and have the blade automatically return to where the previous cut ended. This is useful when the user unloads the mat to remove a cut and then returns the mat to finish cutting the rest of the page. If the "Load Last" button is not pressed, the machine will reset 672 itself so that a new sheet of paper can be used.

Figure 10:
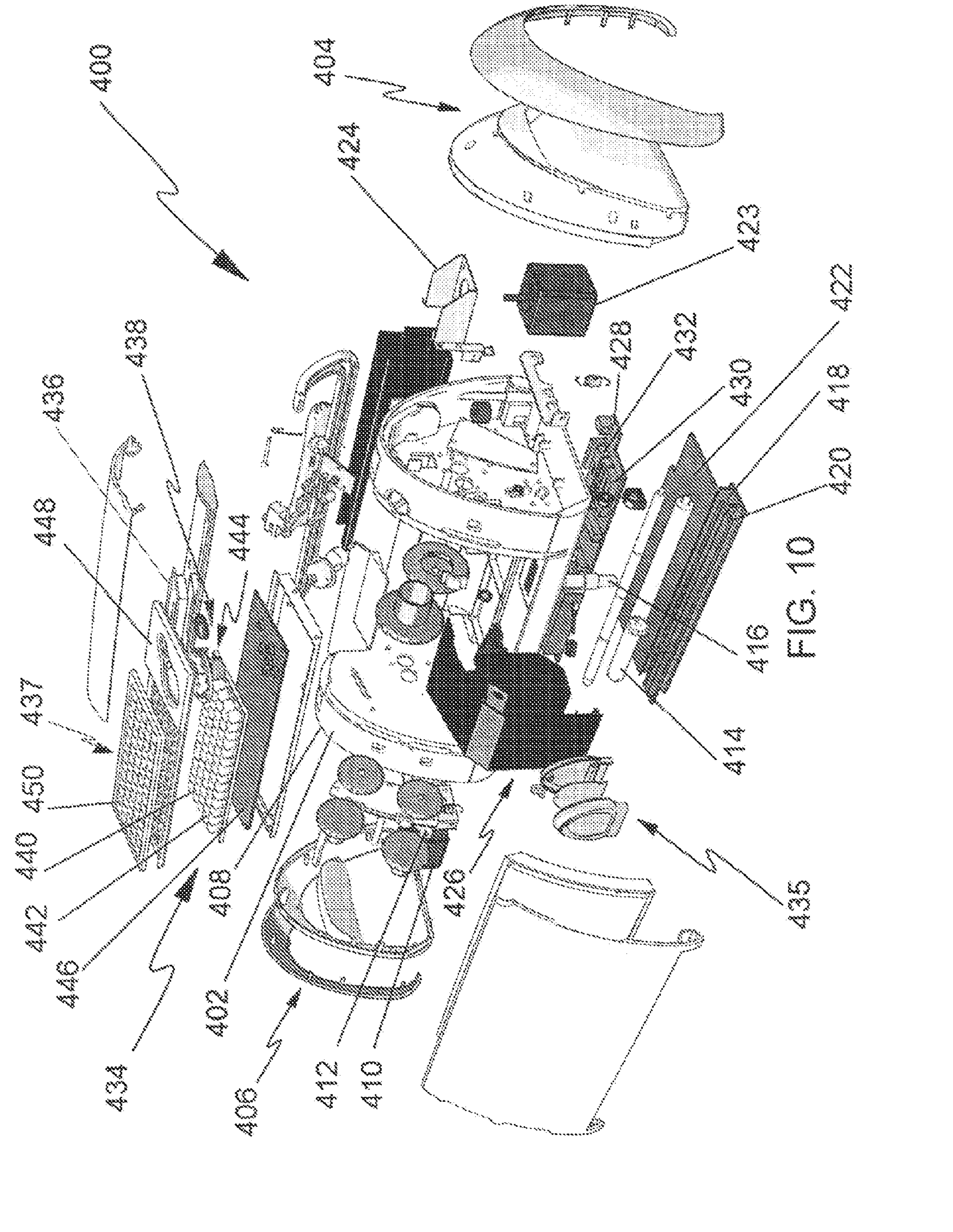
FIG. 10 is an exploded perspective right side view of a cutting machine in accordance with the principles of the present invention.

FIG. 10 is a detailed exploded assembly drawing of a cutter machine, generally indicated at 400, in accordance with the principles of the present invention. The cutter 400 includes a main housing 402 to which the various components of the machine 400 are attached. Right and left end cap assemblies 404 and 406 provide aesthetic coverings for the housing 402 as well as providing recessed handles for grasping the sides of the machine 400. Coupled to the left side 408 of the housing 402 is a stepper motor 410 attached thereto with motor mount 412. The motor 410 drives the drive roller 414 which moves the mat (not shown) relative to the blade housing 416. When assembled, the drive roller 414 is seated within the channel 418 of the base member 420 such that a portion of the top of the roller 414 extends above the top surface 422 of the base member 420 for engaging the bottom surface of the mat.

A second stepper motor 423 mounted relative to the right side 424 of the housing 402 with the motor mount 424 drives the cutter assembly 426. When assembled the blade holder 416 is positioned adjacent the drive roller 414 and moves parallel thereto when cutting.

A circuit board 428 is coupled to and housed within the bottom of the housing 402. The circuit board 428 includes at least one processor 430 and memory 432 for controlling the movement of the stepper motors, communication with the cartridge 435, communication with the user interface 434, controlling the LCD display 436 and communication with an external computer for firmware upgrades, cartridge content downloading, etc.

The processor 430 of the cutter 400 may be an Atmel Mega 128 chip having 128 kb of memory. The cartridge 435 includes its own processor, such as an Atmel Mega 8 chip, along with a 4 or 8 megabyte memory chip. Of course, other sizes, speeds and types of processors and memory chips known in the art may be employed in accordance with the present invention.

The user interface 434 includes the keyboard assembly 437 and cutter control buttons 438. The keyboard assembly includes a keypad 440 that includes a plurality of biased keys 442. The cutter control buttons 438 include a plurality of buttons 444. The key pad and buttons 444 both interface with a circuit board 446 that communicates with the processor 430. A faceplate 448 has a plurality of recesses formed therein for receiving, supporting and maintaining the keypad 440 and buttons. The keys 442 of the keypad are tall enough to protrude through the recesses in the faceplate and to be received in the back of the overlay 450.

Figure 11A:
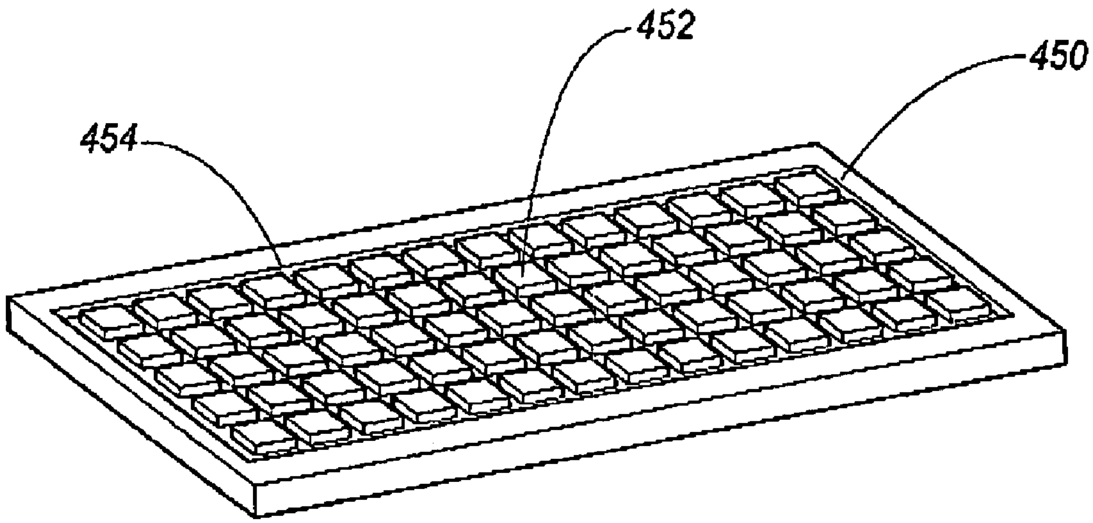
FIG. 11A is a perspective front side view of an overlay in accordance with the principles of the present invention.
Figure 11B:
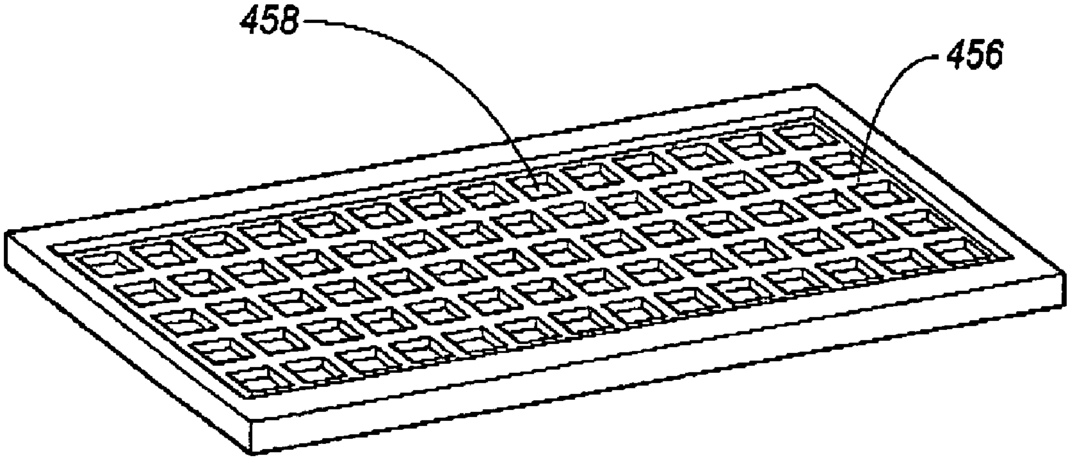
FIG. 11B is perspective bottom side view of the overlay shown in FIG. 11A.

As shown in FIGS. 11A and 11B, the overlay 450 has a plurality of raised protrusions 452 on its front side 454 for being depressed by a user. On the back side 456, the overlay 450 has a plurality of corresponding recesses 458 formed therein for receiving the individual keys 442 of the keypad 440. The overlay is formed, as by molding, from a rubber-like material that is flexible and resilient to allow a user to depress the overlay and thus depress a button beneath the overlay. Thus, when the user presses a particular protrusion 452, the corresponding key beneath that protrusion is depressed. The engagement of the recesses 458 with the keys, when placed over the keys 442, holds the overlay 450 in relative position to the keys and thus the keypad to ensure that the keys are always properly aligned with the overlay.

Figure 12:
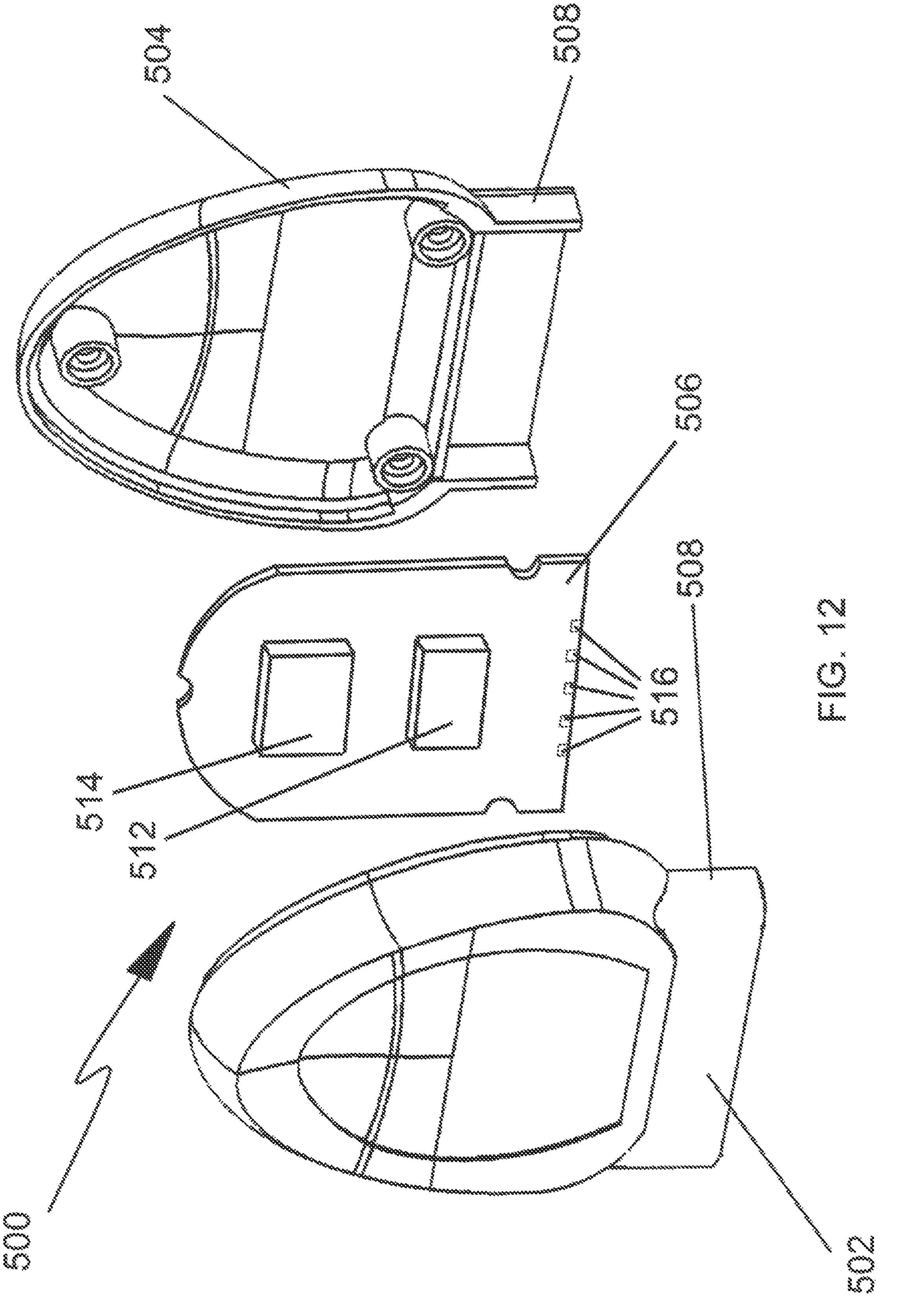
FIG. 12 is an exploded perspective right side view of a cartridge in accordance with the principles of the present invention.

As shown in FIG. 12, a cartridge 500 in accordance with the present invention is comprised of two housing components 502 and 504 that house a circuit board 506 which includes a processor 512 and memory 514. The processor 512 communicates with the cutter via circuit board terminals or contacts 516. The memory 514 stores various data in the form of algorithms that constitute the images or characters contained in the particular cartridge 500. The processor 512 communicates with the processor of the cutter to allow the transfer of the data stored on the cartridges to the cutter. As such, in a typical configuration the data contained on the cartridge cannot be modified and a new cartridge is used for each new font and/or image set. Through the port on the cutter (e.g., a USB port), the cutter will allow, in certain circumstances, the ability to upload new images, fonts, firmware updates, etc. to the cartridge and/or cutter. The housing, when assembled, forms a socket insert portion 508 that is sized and shaped to fit a socket provided in the cutter so that the contacts 516 engage with the cutter socket for communication with the cutter.

Figure 13:
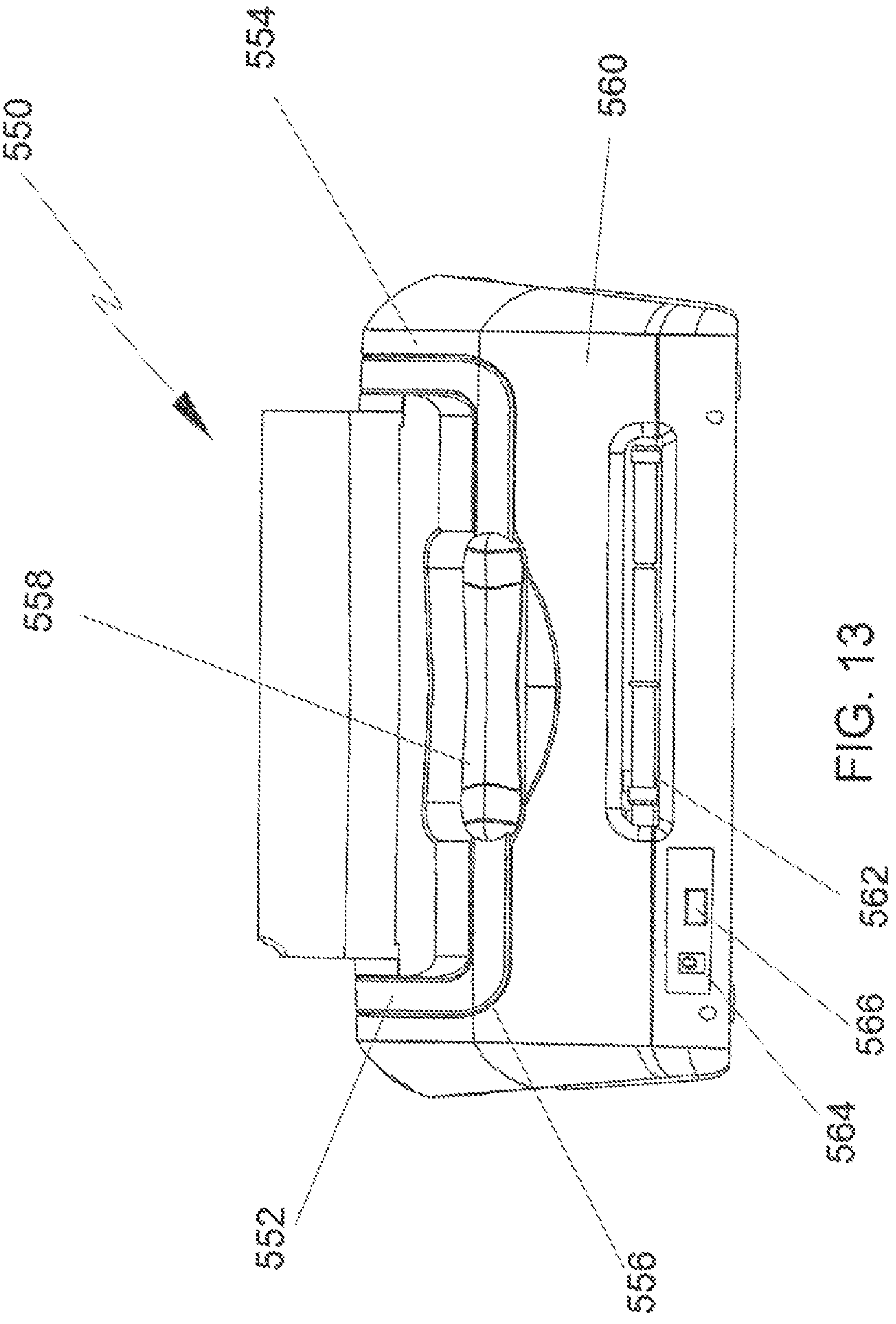
FIG. 13 is a back side view of a cutting machine in accordance with the principles of the present invention.

Referring now to FIG. 13, there is illustrated the back side of a cutter 550 in accordance with the present invention. The cutter 550 includes a carrying handle 552 that substantially matches the exterior contour of the machine 550. The machine exterior 554 defines a recess 556 configured for receiving the handle 552 therein. The handle 552 includes a grasping portion 558 that may be provided with a soft grip. When grasped and lifted, the handle 552 rotates upwardly relative to the surface 554 to allow the user to carry the machine 550.

In addition, the back surface 560 of the machine 550 includes an elongate opening 562 for allowing the mat to protrude through the opening during the cutting process. Also provided is a power adapter port 564 for connecting to an electrical power cord and a USB port 566 for attaching the cutter 550 to an external computer. As previously discussed, however, the cutter 550 can be fully operated without the use of an external computer attached thereto. The connection 566 is therefore provided to all the firmware of the machine 550 to be updated as well as for communication with the machine 550 to allow content stored on a particular cartridge to be updated through the machine 550.

While the cutting machine of the present invention has been described as being a completely self contained, stand-alone machine, those of skill in the art will appreciate that various components, processes and methodologies taught and described herein could be adapted for use with existing cutter machines known in the art. In addition, it is further contemplated that the cutter machine could be configured without the use of a separate cartridge such that all images, shapes and characters are stored on non-removable memory, the content of which could be updated by connection to a personal computer. In addition, if a replaceable memory module is desired, while the cartridge of the present invention is shown as having a particular unique configuration, memory storage devices of known configurations could be adapted for use therein, such as the use of flash memory cards known in the art.

Figure 16:
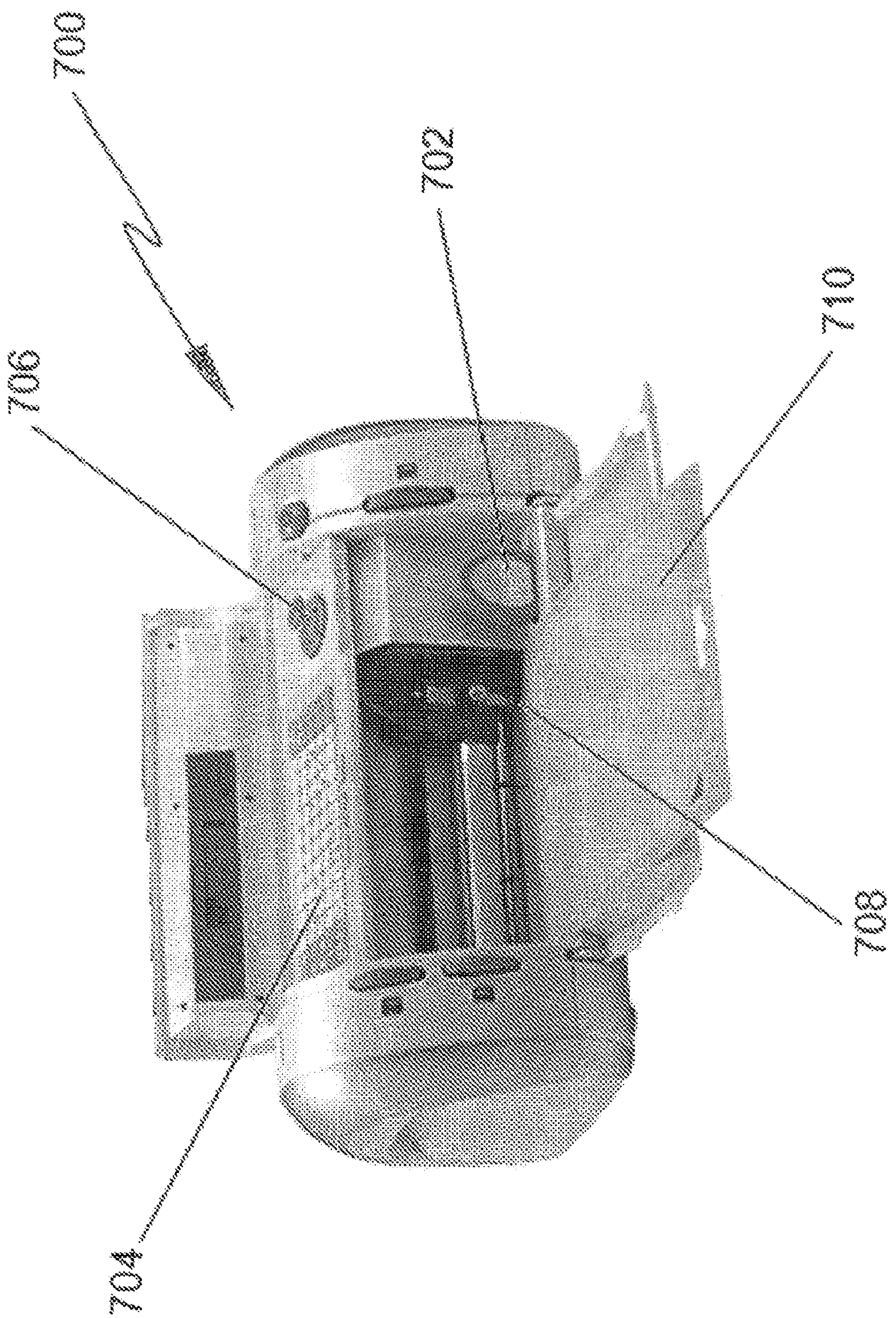
FIG. 16 is a perspective front view of an alternative embodiment of an electronic cutter in an open configuration in accordance with the principles of the present invention.

The cutting machine 700 as shown in FIG. 16 of the present invention has vast capabilities that allow the user to customize the images, characters and/or shapes to be cut. For example, each cartridge 702 contains and associated overlay 704 provides feature buttons for custom feature effects. These features may vary with each specific cartridge to add a powerful element of expansion and versatility. In addition, the arrow buttons that surround the CUT button 706 can be used to guide the blade to a desired location. This is very useful when needing to cut in a certain spot on the paper, especially to avoid waste. When moving away from the starting point 708 indicated on the cutting mat 710, the size of the image may need to be reduced in order for the machine to cut the image. If the remaining paper size is too small, the machine will alert the user and allow the user to reduce the size of the image to be cut. If sizes other than the standard size of paper for the machine are used, the user can use the blade positioning buttons and size dial to adjust for the given paper size. By pressing the "Set Paper Size" button, the user can input a custom paper size into the machine and the machine will know where "home" cut position is for the loaded sheet. The machine will cut lengthwise with "down", as defined by the bottom of the image, being toward the left edge of the paper when viewing the machine from the front.

The machine 700 is also provided with various unique features such as "Paper Save." This setting will automatically rearrange the selected shapes to cluster them together and take advantage of otherwise empty space on the paper.

If material to be cut other than regular paper or cardstock is selected, the machine may be customized for such other materials. For example, the pressure dial may need to be rotated to increase or decrease the pressure of the blade against the material to be cut to allow the blade to completely cut through the material without tearing the material. In addition, some paper materials may require a slower cutting speed. Thus, the speed dial can be decreased to allow the blade to cut without tearing. For thicker or thinner materials, the blade depth can be adjusted by rotating the blade housing adjustment knob as previously discussed.

The default size of images and shapes for the machine is "relational." This means that all of the cut results for a given character set will be in proportion to the largest possible character or image contained in the set (referred to as Key Height Character). This maintains letters correctly sized in relation to each other. By pressing the "Real Dial Sizing" button, however, the literal size of images or letters is selected. Thus, for example, the letter "c" will be shorter when cut than the letter "f".

It is understood that the terminology used herein is used for the purpose of describing particular embodiments only and is not intended to limit the scope of the present invention. In addition, the use of the term "shape" herein, refers to a particular image, font or character that may be stored on the machine of the present invention, on a cartridge for the machine or in any other location for being cut by the machine. Moreover, the use of the term "sheet" herein refers to any material in sheet form that can be cut with the machine of the present invention, including without limitation papers of various thicknesses including such materials as colored papers and card stock as well as sheets of plastic, cardboard, foil or other materials known in the art. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods, compositions, and materials of the present invention are described herein, any methods and materials similar or equivalent to those described herein may by used in the practice or testing of the present invention. All references cited herein are incorporated by reference in their entirety and for all purposes.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. An apparatus for cutting a workpiece, comprising:

a housing having an outer housing surface and an inner housing surface including at least a substantially planar first workpiece support surface, wherein the inner housing surface defines a cavity;

a cutting mechanism coupled to said housing and movably-arranged at least within said cavity;

a first door pivotally coupled to said housing, wherein the first door is pivotably-arranged relative to said housing in one of two positions including an open position and a closed position, wherein said first door includes an outer door surface and an inner door surface defining a substantially planar second workpiece support surface, wherein said outer door surface is substantially aligned with the outer housing surface when the first door is pivotably-arranged relative to said housing in the closed position, wherein said substantially planar second workpiece support surface of said inner door surface is arranged in a substantially co-planar orientation with said substantially planar first workpiece support surface when the first door is pivotably-arranged relative to said housing in the open position;

a biasing mechanism coupled to said first door for biasing said first door in said open position;

a second door pivotally coupled to said housing pivotable between an open position and a closed position;

a power button for turning on and off the power, said power button coupled to a release mechanism for releasing said second door from the closed position when said power button is depressed, said second door biased into an open position, said power button also coupled to a release mechanism for releasing said first door from the closed position when said power button is depressed; and a user display coupled to an inside of said second door.

2. The apparatus for cutting a workpiece of claim 1, wherein the first door provides means for substantially enclosing the cutting mechanism within the cavity of the housing when the first door is pivotably-arranged relative to said housing in the closed position, and means for exposing at least a portion of said cutting mechanism when the first door is pivotably-arranged relative to said housing in the open position, wherein one or more of the substantially planar first workpiece support surface and the substantially planar second workpiece support surface provides means for supporting the workpiece that is to be cut by the cutting mechanism when the first door is pivotably-arranged relative to said housing in the open position.

3. The paper cutting apparatus of claim 1, wherein said cutting mechanism comprises a drive roller for moving a sheet to be cut in a first direction and a cutting assembly positioned relative to said drive roller moveable in a second direction substantially perpendicular to said first direction, whereby combined controlled movement of said drive roller and said cutting assembly causes a shape to be cut in the sheet.

4. The apparatus for cutting a workpiece of claim 1 further comprising a user interface coupled to said housing;

a processor coupled to one or more of user interface and the cutting mechanism, wherein the processor provides means for receiving workpiece cutting instructions from the user by way of said user interface, wherein the workpiece cutting instructions control movement of said cutting mechanism; and a memory device coupled to said processor, wherein said memory device provides means for permitting one or more of the functions of selecting one or more previously-stored cutting instructions that are saved in the memory, and storing one or more user-entered cutting instructions, wherein said memory device comprises a removable cartridge.

5. The apparatus for cutting a workpiece of claim 4, wherein the housing includes a socket, wherein the socket provides means for coupling said removable cartridge to said housing to allow communication of one or more of said previously-stored cutting instructions or said user-entered cutting instructions from said removable cartridge to said processor, wherein the inner door surface further defines a cartridge recess integral with said inner door surface that accommodates the removable cartridge when the removable cartridge is coupled to the socket and when the door is pivotably-arranged relative to said housing in the closed position.

6. The apparatus for cutting a workpiece of claim 4, wherein said user interface further comprises a keyboard, wherein the keyboard includes a removable keyboard overlay, wherein said removable keyboard overlay includes a graphical representation of one or more of fonts, characters and images that correspond to available cutting instructions available for selection from the memory device.

7. The apparatus for cutting a workpiece of claim 4, wherein said user interface provides means for permitting a user to select a size of a shape to be cut into the workpiece.

8. The apparatus for cutting a workpiece of claim 7, wherein said size of the shape to be cut into the workpiece includes at least three sizes.

9. The apparatus for cutting a workpiece of claim 4, wherein said user interface comprises at least one device, wherein the at least one device provides means for allowing a user to select at least one of a speed and a pressure of the cutting mechanism, wherein the speed and the pressure of the cutting mechanism is selectable by the user in order to prevent tearing of the workpiece and to ensure that the cutting mechanism cuts through said workpiece.

10. The paper cutting apparatus of claim 1, further comprising at least one handle incorporated into said housing for carrying said housing.

11. The paper cutting apparatus of claim 10, wherein said at least one handle comprises at least one recess formed in said housing.

12. The paper cutting apparatus us of claim 10, wherein said housing defines at least one recess for receiving at least a portion of said at least one handle therein, said at least one handle movable relative to said housing when grasped by a user to allow the user to carry said housing.

13. The paper cutting apparatus of claim 12, wherein said at least one handle is pivotally coupled to said housing.

* * * * *

UNITED STATES PATENT AND TRADEMARK OFFICE

CERTIFICATE OF CORRECTION

PATENT NO. : 7,845,259 B2
APPLICATION NO. : 11/457415
DATED : December 7, 2010
INVENTOR(S) : Robert E. Workman et al.

It is certified that error appears in the above-identified patent and that said Letters Patent is hereby corrected as shown below:

In the Claims:

Please correct Claim 12 as follows:

Column 20, Line 16, after the word apparatus, delete the word "us".

Signed and Sealed this
Eighth Day of February, 2011

David J. Kappos
*Director of the United States Patent and Trademark Office*